US009750082B2

(12) United States Patent
Zavadsky et al.

(10) Patent No.: US 9,750,082 B2
(45) Date of Patent: Aug. 29, 2017

(54) SYSTEMS AND METHODS FOR NOISE FLOOR OPTIMIZATION IN DISTRIBUTED ANTENNA SYSTEM WITH DIRECT DIGITAL INTERFACE TO BASE STATION

(71) Applicant: ADC Telecommunications, Inc., Berwyn, PA (US)

(72) Inventors: Dean Zavadsky, Shakopee, MN (US); Philip M. Wala, Savage, MN (US)

(73) Assignee: CommScope Technologies LLC, Hickory, NC (US)

(*) Notice: Subject to any disclaimer, the term of this patent is extended or adjusted under 35 U.S.C. 154(b) by 148 days.

(21) Appl. No.: 14/506,145

(22) Filed: Oct. 3, 2014

(65) Prior Publication Data

US 2015/0098419 A1   Apr. 9, 2015

Related U.S. Application Data

(60) Provisional application No. 61/887,703, filed on Oct. 7, 2013.

(51) Int. Cl.
 *H04W 88/08* (2009.01)
 *H04W 88/16* (2009.01)
 *H04W 92/02* (2009.01)

(52) U.S. Cl.
 CPC ......... *H04W 88/085* (2013.01); *H04W 88/16* (2013.01); *H04W 92/02* (2013.01)

(58) Field of Classification Search
 CPC ............... H04W 88/005; H04W 88/16; H04W 92/02–92/24
 See application file for complete search history.

(56) References Cited

U.S. PATENT DOCUMENTS 3,685,047 A   8/1972   Sherer et al.
4,697,236 A   9/1987   Butts et al.
(Continued)

FOREIGN PATENT DOCUMENTS

GB   2354674   3/2001
WO   2008076432   6/2008
(Continued)

OTHER PUBLICATIONS

U.S. Patent and Trademark Office, "Notice of Allowance", "U.S. Appl. No. 12/814,896", Jan. 24, 2013, pp. 1-14.
(Continued)

*Primary Examiner* — Timothy J Weidner
(74) *Attorney, Agent, or Firm* — Fogg & Powers LLC

(57) ABSTRACT

A signal interface unit for a distributed antenna system includes a channelized radio carrier interface configured to communicate an uplink channelized radio carrier for a radio frequency carrier to a channelized radio carrier base station interface; an antenna side interface configured to receive an uplink digitized radio frequency signal from the distributed antenna system communicatively coupled to the antenna side interface; and a signal conversion module communicatively coupled between the channelized radio carrier interface and the antenna side interface and configured to convert between the uplink digitized radio frequency signal and the uplink channelized radio carrier at least in part by adjusting at least one uplink attribute of the uplink digitized radio frequency signal received from the distributed antenna system to comply with requirements of the channelized radio carrier base station interface.

72 Claims, 10 Drawing Sheets

(56) References Cited

U.S. PATENT DOCUMENTS

| | | |
|---|---|---|
| 5,280,472 A | 1/1994 | Gilhousen et al. |
| 5,519,691 A | 5/1996 | Darcie et al. |
| 5,969,837 A | 10/1999 | Farber et al. |
| 6,801,767 B1 | 10/2004 | Schwartz et al. |
| 7,088,742 B2 | 8/2006 | Oliver et al. |
| 7,103,377 B2 | 9/2006 | Bauman et al. |
| 7,171,244 B2 | 1/2007 | Bauman |
| 7,184,728 B2 | 2/2007 | Solum |
| 7,505,747 B2 | 3/2009 | Solum |
| 7,526,002 B2 | 4/2009 | Oliver et al. |
| 7,539,509 B2 | 5/2009 | Bauman et al. |
| 7,546,138 B2 | 6/2009 | Bauman |
| 7,590,354 B2 | 9/2009 | Sauer et al. |
| 7,599,711 B2 | 10/2009 | Hermel et al. |
| 7,627,250 B2 | 12/2009 | George et al. |
| 7,688,135 B2 | 3/2010 | Kim et al. |
| 7,787,854 B2 | 8/2010 | Conyers et al. |
| 7,805,073 B2 | 9/2010 | Sabat, Jr. et al. |
| 7,844,273 B2 | 11/2010 | Scheinert |
| 7,848,654 B2 | 12/2010 | Sauer et al. |
| 7,848,770 B2 | 12/2010 | Scheinert |
| 7,917,177 B2 | 3/2011 | Bauman |
| 7,961,689 B2 | 6/2011 | Stratford |
| 7,962,111 B2 | 6/2011 | Solum |
| 7,974,244 B2 | 7/2011 | Hermel |
| 8,010,116 B2 | 8/2011 | Scheinert |
| 8,050,291 B1 | 11/2011 | Prasad et al. |
| 8,064,850 B2 | 11/2011 | Yang et al. |
| 8,111,998 B2 | 2/2012 | George et al. |
| 8,135,273 B2 | 3/2012 | Sabat, Jr. et al. |
| 8,149,950 B2 | 4/2012 | Kim et al. |
| 8,213,401 B2 | 7/2012 | Fischer et al. |
| 8,224,266 B2 | 7/2012 | Liu et al. |
| 8,229,497 B2 | 7/2012 | Scheinert |
| 8,270,387 B2 | 9/2012 | Cannon et al. |
| 8,274,332 B2 | 9/2012 | Cho et al. |
| 8,310,963 B2 | 11/2012 | Singh |
| 8,326,238 B2 | 12/2012 | Yang et al. |
| 8,346,091 B2 | 1/2013 | Kummertz et al. |
| 8,351,877 B2 | 1/2013 | Kim et al. |
| 8,380,143 B2 | 2/2013 | Yang et al. |
| 8,401,499 B2 | 3/2013 | Kim et al. |
| 8,467,747 B2 | 6/2013 | Kim et al. |
| 8,472,897 B1 | 6/2013 | Yang |
| 8,532,698 B2 | 9/2013 | Scheinert |
| 8,805,182 B2 | 8/2014 | Sabat, Jr. et al. |
| 8,948,155 B2 | 2/2015 | Cannon et al. |
| 8,958,410 B2 | 2/2015 | Fischer et al. |
| 9,130,609 B2 | 9/2015 | Kummetz et al. |
| 9,231,670 B2 | 1/2016 | Schmid et al. |
| 2001/0046840 A1 | 11/2001 | Kim |
| 2003/0045284 A1 | 3/2003 | Copley et al. |
| 2004/0125897 A1 | 7/2004 | Ariyavisitakul et al. |
| 2005/0111475 A1 | 5/2005 | Borkowski et al. |
| 2006/0172775 A1 | 8/2006 | Conyers et al. |
| 2006/0233188 A1 | 10/2006 | Oliver et al. |
| 2006/0253872 A1 | 11/2006 | Shoji et al. |
| 2007/0241812 A1 | 10/2007 | Yang et al. |
| 2008/0014948 A1 | 1/2008 | Scheinert |
| 2008/0058018 A1 | 3/2008 | Scheinert |
| 2008/0075158 A1 | 3/2008 | Li |
| 2008/0174365 A1 | 7/2008 | Yang et al. |
| 2008/0174502 A1 | 7/2008 | Oren et al. |
| 2008/0265996 A1 | 10/2008 | Kim et al. |
| 2008/0284509 A1 | 11/2008 | Kim et al. |
| 2009/0054105 A1 | 2/2009 | Hermel |
| 2009/0085658 A1 | 4/2009 | Liu et al. |
| 2009/0096521 A1 | 4/2009 | Liu et al. |
| 2009/0180407 A1 | 7/2009 | Sabat et al. |
| 2009/0238573 A1 | 9/2009 | Bauman |
| 2009/0285194 A1 | 11/2009 | Kim et al. |
| 2009/0307739 A1 | 12/2009 | Dean et al. |
| 2010/0135437 A1 | 6/2010 | Lee et al. |
| 2010/0177760 A1 | 7/2010 | Cannon et al. |
| 2010/0271957 A1 | 10/2010 | Stapleton et al. |
| 2010/0278530 A1 | 11/2010 | Kummetz et al. |
| 2010/0296816 A1 | 11/2010 | Larsen |
| 2011/0063169 A1 | 3/2011 | Chen et al. |
| 2011/0135013 A1 | 6/2011 | Wegener |
| 2011/0156815 A1 | 6/2011 | Kim et al. |
| 2011/0158081 A1 | 6/2011 | Wang et al. |
| 2011/0194548 A1 | 8/2011 | Feder et al. |
| 2011/0268449 A1 | 11/2011 | Berlin et al. |
| 2011/0306380 A1* | 12/2011 | Zavadsky ............. H04W 24/02 455/522 |
| 2012/0039254 A1 | 2/2012 | Stapleton et al. |
| 2012/0039320 A1 | 2/2012 | Lemson et al. |
| 2012/0057572 A1* | 3/2012 | Evans ................. H04W 88/085 370/338 |
| 2012/0069880 A1 | 3/2012 | Lemson et al. |
| 2012/0135695 A1 | 5/2012 | Yang et al. |
| 2012/0147993 A1 | 6/2012 | Kim et al. |
| 2012/0154038 A1 | 6/2012 | Kim et al. |
| 2012/0155572 A1 | 6/2012 | Kim et al. |
| 2012/0176966 A1 | 7/2012 | Ling |
| 2012/0213164 A1 | 8/2012 | Zuckerman et al. |
| 2012/0230382 A1 | 9/2012 | Kim et al. |
| 2012/0250740 A1 | 10/2012 | Ling |
| 2012/0263152 A1 | 10/2012 | Fischer et al. |
| 2012/0281565 A1 | 11/2012 | Sauer |
| 2012/0281622 A1 | 11/2012 | Saban et al. |
| 2012/0314797 A1 | 12/2012 | Kummetz et al. |
| 2013/0009707 A1 | 1/2013 | Kim et al. |
| 2013/0017863 A1 | 1/2013 | Kummetz et al. |
| 2013/0077713 A1 | 3/2013 | Kim et al. |
| 2013/0094612 A1 | 4/2013 | Kim et al. |
| 2013/0114486 A1 | 5/2013 | Spedaliere et al. |
| 2013/0114963 A1 | 5/2013 | Stapleton et al. |
| 2013/0121703 A1 | 5/2013 | Kummetz et al. |
| 2013/0128810 A1 | 5/2013 | Lee et al. |
| 2013/0147550 A1 | 6/2013 | Yang et al. |
| 2013/0195467 A1 | 8/2013 | Schmid et al. |
| 2013/0308537 A1 | 11/2013 | Kummetz et al. |
| 2014/0029431 A1* | 1/2014 | Haberland ............ H04W 88/08 370/235 |
| 2014/0146797 A1 | 5/2014 | Zavadsky et al. |
| 2014/0146905 A1 | 5/2014 | Zavadsky et al. |
| 2014/0146906 A1 | 5/2014 | Zavadsky et al. |
| 2014/0341562 A1 | 11/2014 | Sabat, Jr. et al. |
| 2015/0341089 A1 | 11/2015 | Kummetz et al. |

FOREIGN PATENT DOCUMENTS

| | | |
|---|---|---|
| WO | 2010133942 | 11/2010 |
| WO | 2011156465 | 12/2011 |
| WO | 2012044969 | 4/2012 |
| WO | 2012115843 | 8/2012 |

OTHER PUBLICATIONS

U.S. Patent and Trademark Office, "Office Action", "U.S. Appl. No. 12/814,896", Aug. 23, 2012, pp. 1-34.

International Preliminary Examining Authority, "International Preliminary Report on Patentability for Application Serial No. PCT/US2011/040252", "from Foreign Counterpart of U.S. Appl. No. 12/814,896", Dec. 27, 2012, pp. 1-6, Published in: WO.

International Searching Authority, "International Search Report and Written Opinion for Application Serial No. PCT/US2011/040252", "from Foreign Counterpart of U.S. Appl. No. 12/814,896", Jan. 17, 2012, pp. 1-10, Published in: WO.

International Searching Authority, "International Search Report and Written Opinion from PCT Application No. PCT/US2013/071960 mailed Mar. 14, 2014", "from PCT Counterpart of U.S. Appl. No. 14/090,129", Mar. 14, 2014, pp. 1-13, Published in: WO.

International Searching Authority, "International Search Report and Written Opinion from PCT Application No. PCT/US2013/071967 mailed Mar. 10, 2014", "from PCT Counterpart of U.S. Appl. No. 14/090,135", Mar. 10, 2014, pp. 1-9, Published in: WO.

Korean Intellectual Property Office, "International Search Report and Written Opinion from PCT Application No. PCT/US2013/071977 mailed Mar. 20, 2014", "from PCT Counterpart of U.S. Appl. No. 14/090,139", Mar. 20, 2014, pp. 1-14, Published in: WO.

(56) References Cited

OTHER PUBLICATIONS

"Intel Heterogeneous Network Solution Brief", "Published as early as 2011",, pp. 1-5, Publisher: Intel Corporation.
International Searching Authority, "International Search Report and Written Opinion for Application Serial No. PCT/US2014/059371", "from Foreign Counterpart of U.S. Appl. No. 14/506,145", Jan. 19, 2015, pp. 1-11, Published in: WO.
European Patent Office, "Extended European Search Report for EP Application No. 14851729.5", "Foreign Counterpart to U.S. Appl. No. 14/506,145", May 15, 2017, pp. 1-10, Published in: EP.

\* cited by examiner

SYSTEMS AND METHODS FOR NOISE FLOOR OPTIMIZATION IN DISTRIBUTED ANTENNA SYSTEM WITH DIRECT DIGITAL INTERFACE TO BASE STATION

CROSS-REFERENCE TO RELATED APPLICATIONS

This application claims the benefit of U.S. Provisional Patent Application Ser. No. 61/887,703 filed on Oct. 7, 2013, which is hereby incorporated herein by reference.

BACKGROUND

Distributed Antenna Systems (DAS) are used to distribute wireless signal coverage into buildings or other substantially closed environments. The antennas are typically connected to a radio frequency (RF) signal source, such as a service provider's base station. Various methods of transporting the RF signal from the RF signal source to the antenna have been implemented in the art.

SUMMARY

A signal interface unit for a distributed antenna system includes a channelized radio carrier interface configured to communicate an uplink channelized radio carrier for a radio frequency carrier to a channelized radio carrier base station interface; an antenna side interface configured to receive an uplink digitized radio frequency signal from the distributed antenna system communicatively coupled to the antenna side interface; and a signal conversion module communicatively coupled between the channelized radio carrier interface and the antenna side interface and configured to convert between the uplink digitized radio frequency signal and the uplink channelized radio carrier at least in part by adjusting at least one uplink attribute of the uplink digitized radio frequency signal received from the distributed antenna system to comply with requirements of the channelized radio carrier base station interface.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments. Like reference numbers and designations in the various drawings indicate like elements.

DETAILED DESCRIPTION

Figure 1:
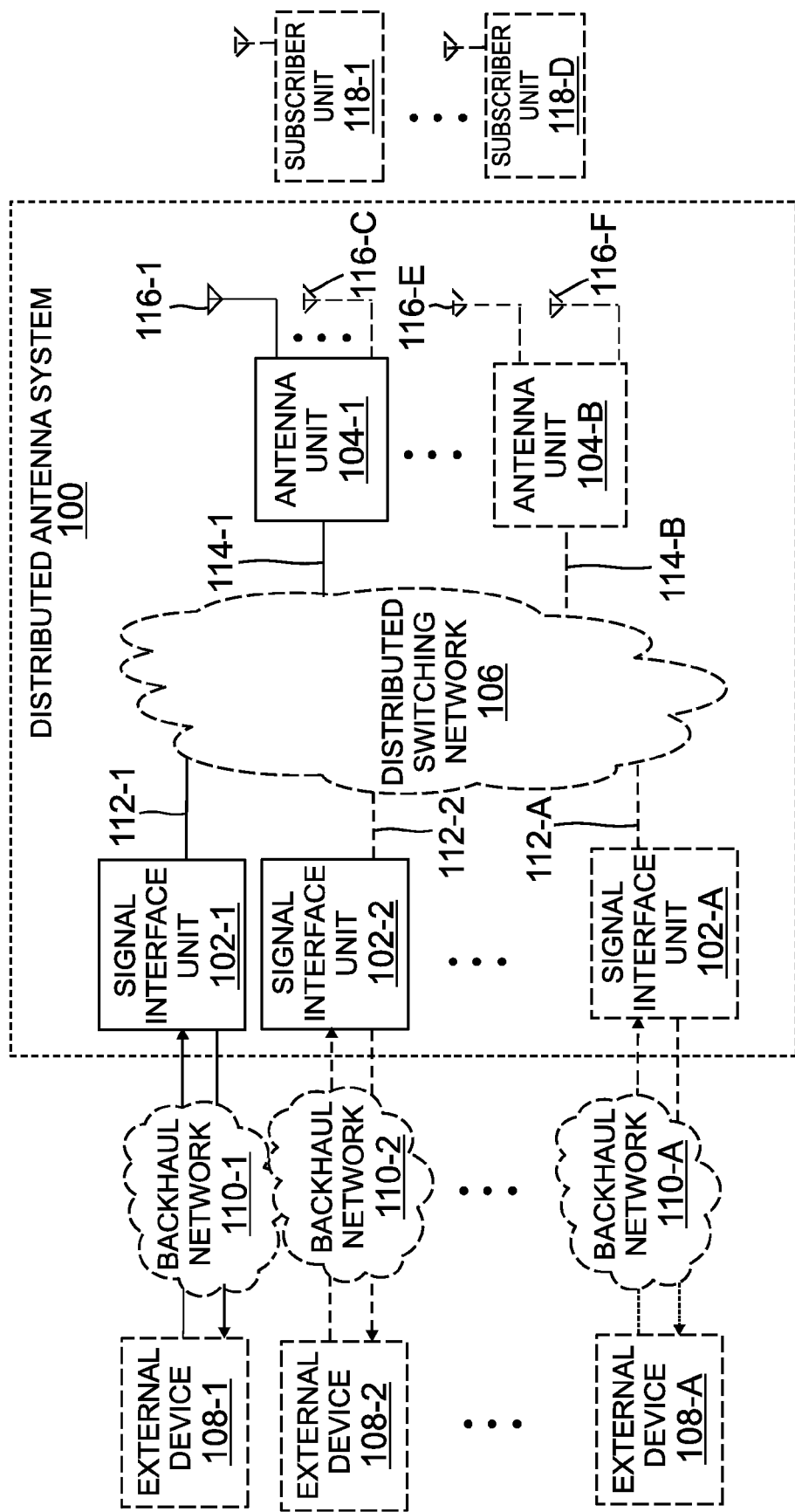
FIG. 1 is a block diagram of an exemplary embodiment of a distributed antenna system.

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The embodiments described below describe a distributed antenna system and components within the distributed antenna system including at least one signal interface unit communicatively coupled to at least one antenna unit through a distributed switching network. In other embodiments, the signal interface unit is directly coupled with the antenna unit or is included with the antenna unit in a single device. The signal interface unit is communicatively coupled to at least one external device, such as a base station, through a backhaul network. In exemplary embodiments, the signal interface unit is at least one of a Common Public Radio Interface (CPRI) base station interface, an Open Base Station Architecture Initiative (OBSAI) base station interface, and an Open Radio Interface (ORI) base station interface. The signal interface acts as a translator to translate uplink and downlink signals between an external device and the distributed antenna system. The translator adjusts attributes of the uplink and downlink signals and reports characteristics in such a way as to cause the antenna system to look like a single radio head to the external device.

In exemplary embodiments, the antenna unit is multi-standard and capable of receiving at least one signal and converting it to radio frequency (RF) and transmitting it using at least one antenna. In exemplary embodiments, the antenna unit is not specific to a number of channels or an air protocol and does not necessarily require any hardware change when channels are added or removed, or a new modulation type or air protocol is used. In exemplary embodiments, a plurality of signal interface units convert a plurality of external device signals received from a plurality of external devices and representing individual channels into a single radio system signal that is transported through the distributed switching network to at least one antenna unit that converts the single radio system signal into radio frequency (RF) signals and transmits them using at least one antenna. In exemplary embodiments, the at least one antenna unit includes a single digital/analog convertor and a single RF converter that can up-convert the entire radio system signal into RF spectrum having various channels.

In exemplary embodiments, the external device signals are channelized signals. As described herein, channelized signals are specific to a particular channel. In exemplary embodiments, the channelized signals are baseband data, such as channelized in-phase (I) and quadrature (Q) data in I/Q pairs. The channelized signals are not positioned relative to one another and require additional baseband conversion before RF conversion and transmission can be performed. Specifically, if a system communicated the channelized signals to an antenna unit, additional processing would be required at the antenna unit to convert the channelized signals before RF conversion and transmission.

In contrast, radio system signals are not specific to a particular channel and may include a number of different channels. The radio system signals represent either digitized or analog spectrum and are one step closer to RF signals than the channelized signals. In exemplary embodiments, the radio system signal is at an intermediate frequency that maps to a large portion of RF spectrum including a number of channels. In exemplary embodiments, the radio system signals can simply be up-converted from the intermediate frequency to radio frequency and transmitted at an antenna unit as described below. Thus, the antenna units do not need the capability of processing channelized signals before RF conversion and transmission. Accordingly, in these exemplary embodiments it doesn't matter what channels are sent to the antenna units. In exemplary embodiments, the antenna unit communicates with subscriber units using a first set of channels at first frequencies and a second set of channels at second frequencies. In exemplary embodiments, the antenna unit communicates using different modulation and/or radio access technologies simultaneously.

FIG. 1 is a block diagram of an exemplary embodiment of a distributed antenna system 100. Distributed antenna system 100 includes at least one signal interface unit 102 (including signal interface unit 102-1, optional signal interface unit 102-2, and any amount of optional signal interface units 102 through optional signal interface unit 102-A), at least one antenna unit 104 (including antenna unit 104-1 and any amount of optional antenna units 104 through optional antenna unit 104-B), and an optional distributed switching network 106.

Each signal interface unit 102 is communicatively coupled to a corresponding external device 108 directly or through a corresponding optional backhaul network 110. Each external device 108 is configured to provide signals to be transported through the distributed antenna system 100 to each corresponding signal interface unit 102. In the forward path, each signal interface unit 102 is configured to receive signals from at least one external device 108. Specifically, signal interface unit 102-1 is communicatively coupled to external device 108-1 through backhaul network 110-1, optional signal interface unit 102-2 is communicatively coupled to optional external device 108-2 through optional backhaul network 110-1, and optional signal interface unit 102-A is communicatively coupled to optional external device 108-A through optional backhaul network 110-1. In exemplary embodiments, the optional backhaul networks 110 include one or more intermediary devices positioned between the signal interface unit 102 and its corresponding external device 108.

Each signal interface unit 102 is also communicatively coupled to the distributed switching network 106 across a communication link 112. Specifically, signal interface unit 102-1 is communicatively coupled to the distributed switching network 106 across communication link 112-1, optional signal interface unit 102-2 is communicatively coupled to the distributed switching network 106 across communication link 112-2, and optional signal interface unit 102-A is communicatively coupled to the distributed switching network 106 across communication link 112-A. As described in more detail below, each signal interface unit 102 is configured to convert signals from the external device 108 to which it is communicatively coupled into a downlink radio system signal and further configured to communicate the downlink radio system signal to the distributed switching network 106 (either directly or through other components of the distributed antenna system 100) across a respective communication link 112.

In exemplary embodiments, at least one signal interface unit 102 is configured to convert the signals from the external device 108 at least in part by digitally adjusting at least one downlink attribute of the downlink digitized radio frequency signal to comply with requirements of the external device. In exemplary embodiments, this digital adjustment is made based on knowledge about the performance characteristics and/or topology of the at least one antenna unit 104 and/or the distributed switching network 106. In exemplary embodiments, this digital adjustment occurs at the bit level. In exemplary embodiments, the requirements of the external device are received at the signal conversion module from the external device interface. In exemplary embodiments, the external device interface is one of a Common Public Radio Interface (CPRI) external device interface, an Open Base Station Architecture Initiative (OB-SAI) external device interface, and an Open Radio Interface (ORI) external device interface.

In exemplary embodiments, the at least one downlink attribute includes a power level, gain, noise floor, and/or delay. In exemplary embodiments where the at least one downlink attribute includes a delay, delays to individual antennas within the distributed antenna system 100 are detected, additional delay is added to the downlink delays for all except the longest delays to normalize and/or equalize the delays in the distributed antenna system 100, and the combined delay-equalized signal is presented to the external device as if it were a single signal with a single delay value.

Similarly in the reverse path, in exemplary embodiments each signal interface unit 102 is configured to receive uplink radio system signals across a respective communication link 112 from distributed switching network 106. Each signal interface unit 102 is further configured to convert the received uplink radio system signal to signals formatted for the associated external device 108 and further configured to communicate the signals formatted for the associated external device 108 to the associated external device 108 directly or across the optional backhaul network 110.

In exemplary embodiments, at least one signal interface unit 102 is configured to convert the received uplink radio system signals to signals formatted for the associated external device 108 at least in part by digitally adjusting at least one uplink attribute of the uplink digitized radio frequency signal received from the distributed antenna system to comply with requirements of the external device. In exemplary embodiments, this digital adjustment is made based on knowledge about the performance characteristics and/or topology of the at least one antenna unit 104 and/or the distributed switching network 106. In exemplary embodiments, this digital adjustment occurs at the bit level. In exemplary embodiments, adjusting the at least one uplink attribute of the uplink digitized radio frequency signal received from the distributed antenna system to comply with requirements of the external device includes scaling the uplink noise floor of the uplink digitized radio frequency signal to make the uplink noise floor comply with requirements for uplink noise floor of the channelized radio carrier base station. In exemplary embodiments, the requirements of the external device are received at the signal conversion module from the external device interface. In exemplary embodiments, the external device interface is one of a Common Public Radio Interface (CPRI) external device interface, an Open Base Station Architecture Initiative (OB-SAI) external device interface, and an Open Radio Interface (ORI) external device interface.

In exemplary embodiments, the at least one uplink attribute of the uplink digitized radio frequency signal includes a power level, delay, and/or uplink noise floor. In exemplary embodiments where the at least one uplink attribute includes a power level, gain, and/or noise floor, the uplink gains from individual antennas are scaled by a factor of 1/N, where N is the number of antennas belonging to that simulcast group. The individual amplitude-adjusted signals are then combined into a composite uplink signal and the summed signal is scaled so that either the composite signal level or the composite noise floor matches what the external device expects to see from a single antenna. The combined gain-equalized signal is presented to the external device as if it were a single signal with a single gain and/or noise floor value. In exemplary embodiments where the at least one uplink attribute includes a delay, delays to individual antennas within the distributed antenna system 100 are detected, additional delay is added to the uplink delays for all except the longest delays to normalize and/or equalize the delays in the distributed antenna system 100, and the combined delay-equalized signal is presented to the external device as if it were a single signal with a single delay value.

In exemplary embodiments, optional distributed switching network 106 couples the plurality of signal interface units 102 with the at least one antenna unit 104. In other embodiments, the at least one antenna unit 104 is directly coupled to the at least one signal interface unit 102-1. Distributed switching network 106 may include one or more distributed antenna switches or other components that functionally distribute downlink radio system signals from the signal interface units 102 to the at least one antenna unit 104. Distributed switching network 106 also functionally distributes uplink signals from the at least one antenna unit 104 to the signal interface units 102. In exemplary embodiments, the distributed switching network 106 can be controlled by a separate controller or another component of the system. In exemplary embodiments the switching elements of the distributed switching network 106 are controlled either manually or automatically. In exemplary embodiments, the routes can be pre-determined and static. In other exemplary embodiments, the routes can dynamically change based on time of day, load, or other factors.

In exemplary embodiments, the downlink radio system signal is a digital signal. In exemplary embodiments, the downlink radio system signal is an analog signal that contains at least one individual channel that is positioned within a set of spectrum that reflects its eventual location within radio frequency spectrum. Said another way, the channel in each downlink radio system signal is at a different frequency than the other channels to which it may be aggregated in the distributed switching network 106. Thus, when multiple downlink radio system signals are aggregated together, the individual channels do not overlap each other and all channels can be upconverted together to radio frequency spectrum simultaneously. In exemplary embodiments, the downlink radio system signal is a digital signal through some of the distributed switching network and is converted to an analog signal at an intermediary device positioned within the distributed switching network.

Each antenna unit 104 is communicatively coupled to the distributed switching network 106 across a communication link 114. Specifically, antenna unit 104-1 is communicatively coupled to the distributed switching network 106 across communication link 114-1 and optional antenna unit 104-B is communicatively coupled to the distributed switching network 106 across communication link 114-B. In exemplary embodiments, some or all of the antenna units 104 receive a single downlink radio system signal from the distributed switching network 106 or directly from a signal interface unit 102. In exemplary embodiments, some or all of the antenna units 104 include components configured for extracting at least one downlink radio system signal from an aggregate downlink radio system signal and components configured for aggregating at least one uplink radio system signal into an aggregate uplink radio system signal as well as at least one radio frequency converter configured to convert between at least one radio system signal and at least one radio frequency band and at least one radio frequency antenna 116 configured to transmit and receive signals in the at least one radio frequency band to at least one subscriber unit 118. In exemplary embodiments, the downlink radio system signal is an aggregate of multiple downlink radio system signals each with a channel positioned within a set of spectrum that reflects its location within the RF spectrum. In exemplary embodiments having multiple downlink radio system signals aggregated together, the individual channels can be converted to the at least one radio frequency band signal simultaneously.

In the downstream, each antenna unit 104 is configured to extract at least one downlink radio system signal from the downlink aggregate radio system signal. Each antenna unit 104 is further configured to convert the at least one downlink radio system signal into a downlink radio frequency (RF) signal in a radio frequency band. In exemplary embodiments, this may include digital to analog converters and oscillators. Each antenna unit 104 is further configured to transmit the downlink radio frequency signal in the radio frequency band to at least one subscriber unit using at least one radio frequency antenna 116. In a specific exemplary embodiment, antenna unit 104-1 is configured to extract at least one downlink radio system signal from the downlink aggregate radio system signal received from the distributed switching network 106 and further configured to convert the at least one downlink radio system signal into a downlink radio frequency signal in a radio frequency band. Antenna unit 104-1 is further configured to transmit the downlink radio frequency signal in a radio frequency band using a radio frequency band radio frequency antenna 116-1 to at least one subscriber unit 118-1. In exemplary embodiments, antenna unit 104-1 is configured to extract a plurality of downlink radio system signals from the downlink aggregate radio system signal received from the distributed switching network 106 and configured to convert the plurality of downlink radio system signals to a plurality of downlink radio frequency signals. In exemplary embodiments with a plurality of radio frequency signals, the antenna unit 104-1 is further configured to transmit the downlink radio frequency signal in at least one radio frequency band to at least one subscriber unit 118-1 using at least one radio frequency antenna 116-1. In exemplary embodiments, the antenna unit 104-1 is configured to transmit one downlink radio frequency signal to one subscriber unit 118-1 using an radio frequency antenna 116-1 and another radio frequency signal to another subscriber unit 118-D using another radio frequency antenna 116-C. In exemplary embodiments, other combinations of radio frequency antennas 116 and other components are used to communicate other combinations of radio frequency signals in other various radio frequency bands to various subscriber units 118, such as but not limited to using multiple radio frequency antenna 116 to communicate with a single subscriber unit 118.

Similarly in the reverse path, in exemplary embodiments each antenna unit 104 is configured to receive uplink radio frequency signals from at least one subscriber unit 118 using at least one radio frequency antenna 116. Each antenna unit 104 is further configured to convert the radio frequency signals to at least one uplink radio system signal. Each antenna unit 104 is further configured to aggregate the at least one uplink radio system signal into an aggregate uplink radio system signal and further configured to communicate the aggregate uplink radio system signal across at least one communication link 114 to the distributed switching network 106. In exemplary embodiments, antenna units 104 multiplex uplink signals in different bands onto the same interface for communication to the next upstream element. In other exemplary embodiments (such as example embodiments implementing diversity processing), the antenna unit 104 aggregates (i.e. sum/combine) uplink signals in an intelligent manner. In exemplary embodiments, each uplink radio system signal contains a channel that is positioned within a set of spectrum that reflects its location within the RF spectrum. Thus and even though the uplink radio system signals that are aggregated will overlap in frequency spectrum, the individual channels themselves from the aggregated uplink radio system signals do not overlap each other when multiple uplink radio system signals are aggregated together.

In exemplary embodiments, a master reference clock is distributed between the various components of the distributed antenna system 100 to keep the various components locked to the same clock. In exemplary embodiments, a master reference clock is provided to at least one external device 108 via at least one signal interface unit 102 so that the external device 108 can lock to the master reference clock as well. In other exemplary embodiments, the master reference clock is provided from at least one external device 108 to the distributed antenna system 100 via at least one signal interface unit 102. In exemplary embodiments, the master reference clock is generated within a component of the distributed antenna system 100, such as a signal interface unit 102, an antenna unit 104, or somewhere within the distributed switching network 106.

In exemplary embodiments, the communication links 112 and/or the communication links 114 are optical fibers and the communication across the communication links 112 and/or the communication links 114 is optical. In these embodiments, an electrical to optical conversion occurs at the antenna units 104 and/or at an intermediary device within the optional distributed switching network 106. In other embodiments, the communication links 112 and/or the communication links 114 are conductive cables (such as coaxial cable, twisted pair, etc.) and the communication across the communication links 112 and/or the communication links 114 is electrical. In exemplary embodiments, the communication across the communication links 112 and/or the communication links 114 is digital. In exemplary embodiments, the communication across the communication links 112 and/or the communication links 114 is analog. In exemplary embodiments, any mixture of optical, electrical, analog, and digital communication occurs across the communication links 112 and the communication links 114. In exemplary embodiments, an antenna unit 104 may include functionality to convert between digital and analog signals.

FIGS. 2A-2D are block diagrams of exemplary embodiments of signal interface units 102 used in distributed antenna systems, such as exemplary distributed antenna system 100 described above. Each of FIGS. 2A-2D illustrates a different embodiment of a type of signal interface unit 102, labeled 102A-102D respectively.

Figure 2A:
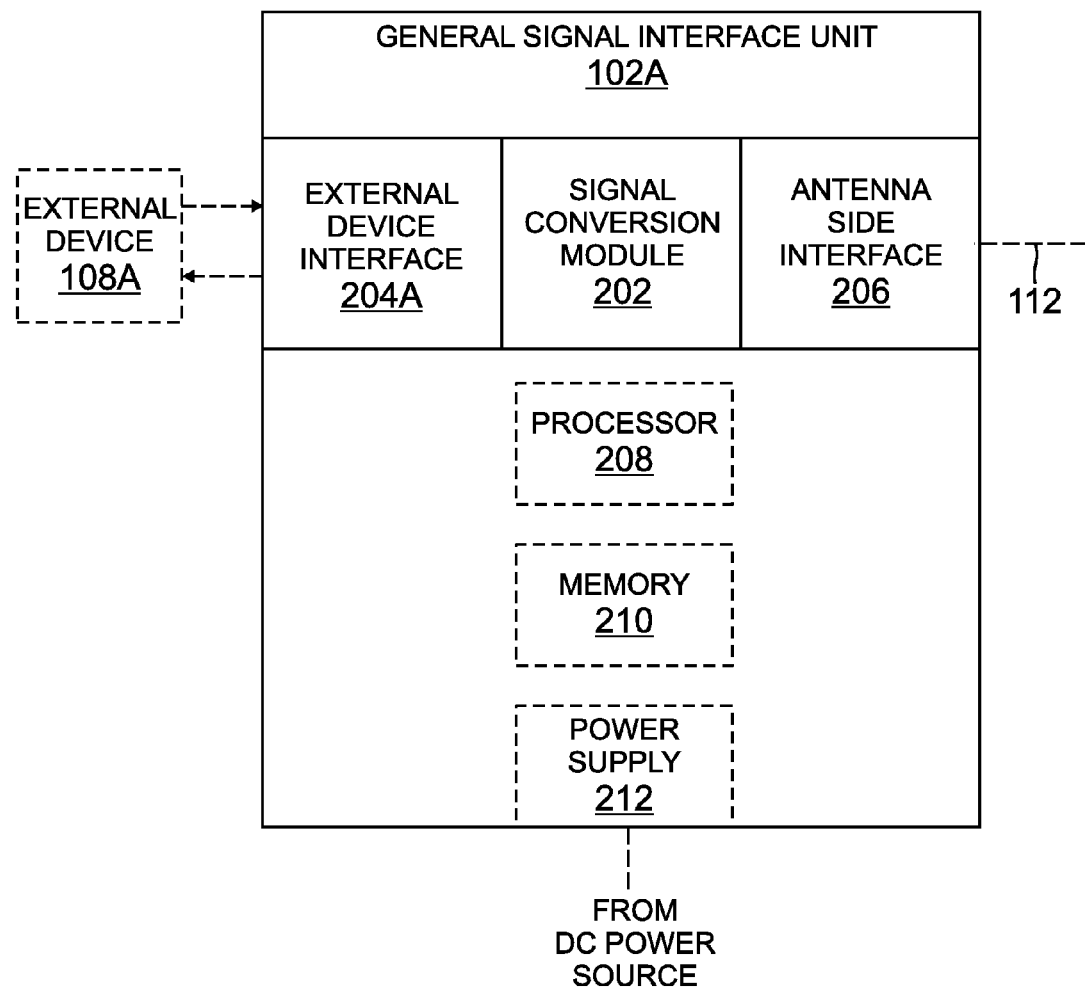
FIGS. 2A-2D are block diagrams of exemplary embodiments of signal interface units used in distributed antenna systems, such as the exemplary distributed antenna system in FIG. 1.

FIG. 2A is a block diagram of an exemplary embodiment of a signal interface unit 102, general signal interface unit 102A. General signal interface unit 102A includes signal conversion module 202, external device interface 204A, antenna side interface 206, optional processor 208, optional memory 210, and optional power supply 212. In exemplary embodiments, signal conversion module 202 is communicatively coupled to an external device 108A through the external device interface 204A. Signal conversion module 202 is also communicatively coupled to at least one communication link 112 by antenna side interface 206. In exemplary embodiments, the communication link 112 is an optical communication link across a fiber optic cable, though it can also be other types of wired or wireless links in other embodiments. In exemplary embodiments, the signal conversion module 202 and/or portions of the external device interface 204A and/or the antenna side interface 206 are implemented using optional processor 208 and optional memory 210. In exemplary embodiments, the optional power supply 212 provides power to the various elements of the signal interface unit 102A.

In the downlink, the external device interface 204A is configured to receive downlink radio system signals from the external device 108A. The signal conversion module 202 is configured to convert the received downlink radio system signals to a downlink radio system signal. In exemplary embodiments, the signal conversion module 202 and/or the antenna side interface 206 converts the radio system signal from electrical signals to optical signals for output on communication link 112. In other embodiments, the radio system signal is transported using a conductive communication medium, such as coaxial cable or twisted pair, and the optical conversion is not necessary. The antenna side interface 206 is configured to communicate the downlink radio system signal on communication link 112.

In exemplary embodiments, the signal conversion module 202 is further configured to adjust a downlink attribute of the downlink radio system signal based on differences in attributes and/or performance characteristics of the external device 108A and the general signal interface unit 102A and/or distributed antenna system 100. In exemplary embodiments, the signal conversion module 202 adjusts at least one of these downlink attributes based on requirements set by the external device 108A and knowledge about the attributes and/or performance characteristics of the distributed antenna system 100's effect on the downlink signals. This enables the distributed antenna system 100 to distribute downlink radio system signals to at least one antenna unit 104 that will then be broadcast to at least one subscriber unit 118 and appear as if it were transmitted directly from a radio head connected to the external device 108A. This enables the distributed antenna system 100 to appear transparent to the at least one subscriber unit 118 in the downlink.

In exemplary embodiments, the at least one downlink attribute of the downlink radio system signal includes a power level, gain, noise floor, and/or delay. In exemplary embodiments where the at least one downlink attribute includes a delay, delays to individual antennas within the distributed antenna system 100 are detected, additional delay is added to the downlink delays for all except the longest delays to normalize and/or equalize the delays in the distributed antenna system 100, and the combined delay-equalized signal is presented to the external device 108A as if it were a single signal with a single delay value.

In exemplary embodiments, the downlink radio system signal is specific to a particular channel and requires additional baseband conversion before radio frequency conversion and transmission can be performed. In exemplary embodiments, the downlink radio system signal is not specific to a particular channel and does not require additional baseband conversion before radio frequency conversion and transmission can be performed. In exemplary embodiments, the downlink radio system signal contains an individual channel that is positioned within a set of spectrum that reflects its eventual location within radio frequency spectrum. In exemplary embodiments, the downlink radio system signal interface is communicatively coupled with an intermediary device that aggregates the downlink radio system signal with at least one other downlink radio system signal before being transmitted to at least one antenna unit 104. In exemplary embodiments, the individual channels within the downlink radio system signal and the at least one other downlink radio system signal do not overlap and can be upconverted together simultaneously to radio frequency spectrum.

In the uplink, antenna side interface 206 is configured to receive an uplink radio system signal from communication link 112. In exemplary embodiments where communication link 112 is an optical medium, the antenna side interface 206 and/or the signal conversion module 202 is configured to convert the uplink radio system signal between received optical signals and electrical signals. In other embodiments, the radio system signal is transported using a conductive communication medium, such as coaxial cable or twisted pair, and the optical conversion is not necessary. The signal conversion module 202 is further configured to convert the uplink radio system signal to uplink signals. External device interface 204A is configured to communicate the uplink signals to the external device 108A.

In the uplink of exemplary embodiments, the signal conversion module 202 is further configured to adjust an uplink attribute of the uplink radio system signal based on differences in attributes and/or performance characteristics of the external device 108A and the general signal interface unit 102A and/or distributed antenna system 100. In exemplary embodiments, the signal conversion module 202 adjusts at least one of these uplink attributes based on requirements set by the external device 108A and knowledge about the attributes and/or performance characteristics of the distributed antenna system 100's effect on the uplink signals. This enables the distributed antenna system 100 to receive uplink radio system signals from at least one antenna unit 104 that were received from at least one subscriber unit 118 and appear as if it were received directly at a radio head connected to the external device 108A. This enables the distributed antenna system 100 to appear transparent to the at least one external device 108A in the uplink.

In exemplary embodiments, the at least one uplink attribute of the uplink radio system signal includes a power level, gain, uplink noise floor, and/or delay. In exemplary embodiments where the at least one uplink attribute includes a power level, gain, and/or noise floor, the uplink gains from individual antennas are scaled by a factor of 1/N, where N is the number of antennas belonging to that simulcast group. The individual amplitude-adjusted signals are then combined into a composite uplink signal and the summed signal is scaled so that either the composite signal level or the composite noise floor matches what the external device 108A expects to see from a single antenna. The combined gain-equalized signal is presented to the external device 108A as if it were a single signal with a single gain and/or noise floor value. In exemplary embodiments where the at least one uplink attribute includes a delay, delays to individual antennas within the distributed antenna system 100 are detected, additional delay is added to the uplink delays for all except the longest delays to normalize and/or equalize the delays in the distributed antenna system 100, and the combined delay-equalized signal is presented to the external device 108A as if it were a single signal with a single delay value.

In exemplary embodiments, the uplink radio system signal contains an individual channel that is positioned within a set of spectrum that reflects its previous location within radio frequency spectrum. In exemplary embodiments, the general signal interface unit 102A is communicatively coupled with an intermediary device that separates the uplink radio system signal from an aggregate uplink radio system signal received from at least one antenna unit 104 and including at least one other uplink radio system signal. In exemplary implementations, the individual channels within the uplink radio system signal and the at least one other uplink radio system signal do not overlap and can be downconverted together simultaneously from radio frequency spectrum. In exemplary embodiments, the uplink radio system signal is not specific to a particular channel and does not require any baseband processing when converted from radio frequency, while the uplink data may be specific to a particular channel and require baseband processing when being converted from radio frequency.

In exemplary embodiments, an optional signal interface unit clock unit is communicatively coupled to an external device clock unit of the external device 108A. In exemplary embodiments, a master reference clock is provided to the external device clock unit of the external device 108A from the signal interface unit clock unit of the signal interface unit 102A. In other exemplary embodiments, a master reference clock is provided from the external device clock unit of the external device 108A to the signal interface unit clock unit of the signal interface unit 102A. In other exemplary embodiments, a network interface clock unit is not coupled directly to an external device clock unit of the external device 108A to provide the master reference clock to the external device 108A. Instead, a signal interface unit clock unit provides the master reference clock to the signal conversion module 202 and the master reference clock is embedded in an upstream signal from the signal conversion module 202 to the external device 108A. In particular, uplink signals can be clocked using the master clock, such that the master clock is embedded in the uplink signals. Then, an external device clock unit extracts the master clock from uplink signals and distributes the master clock as appropriate in the external device 108A to establish a common clock with the distributed antenna system 100 in the external device 108A. In exemplary embodiments where the master reference clock is provided from an external device 108A to the distributed antenna system 100, the master reference clock can be embedded in the downlink radio system signals by an external device clock unit so that the downlink radio system signals communicated from the external device 108A to the signal conversion module 202 can be extracted by a signal interface unit clock unit and distributed as appropriate within the signal interface unit 102A and the distributed antenna system 100 generally.

Figure 2B:
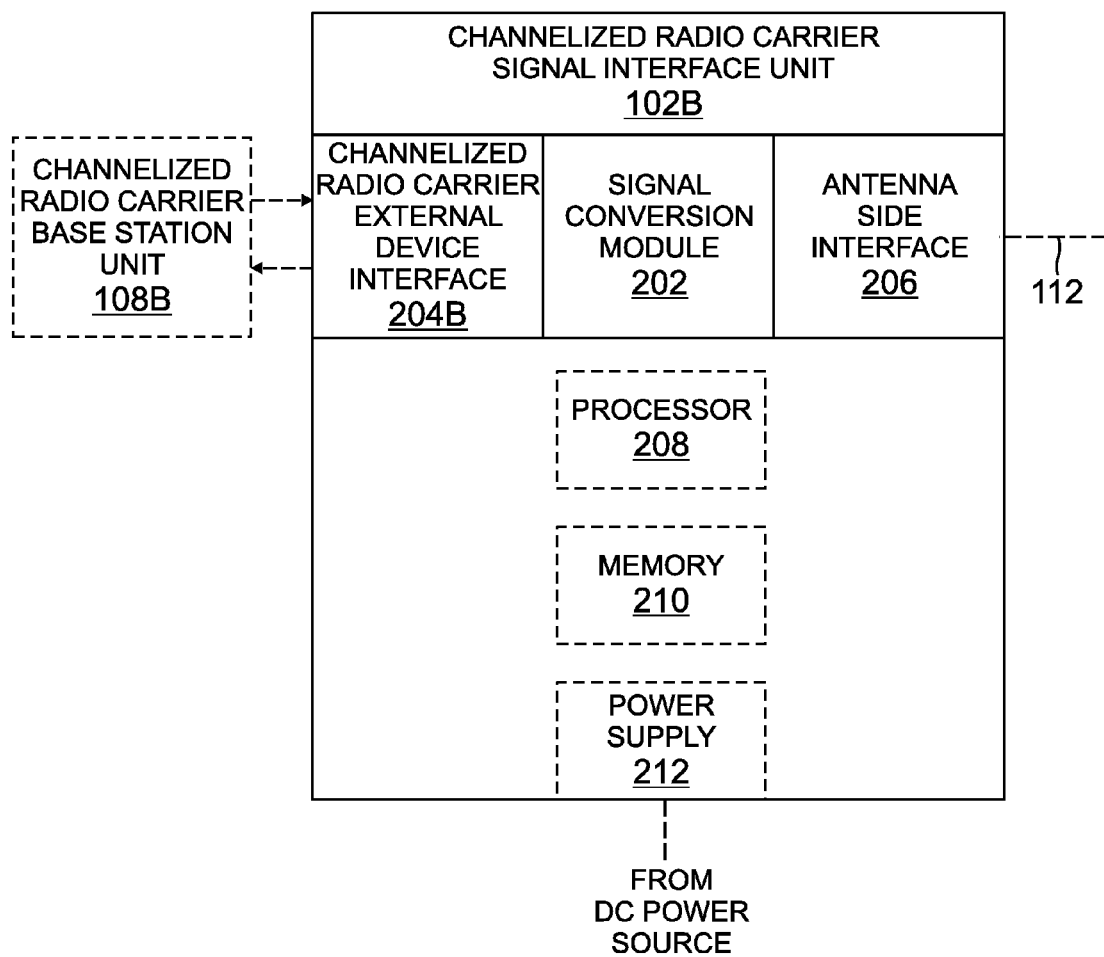

FIG. 2B is a block diagram of an exemplary embodiment of a type of signal interface unit 102, channelized radio carrier signal interface unit 102B. Channelized radio carrier signal interface unit 102B includes a signal conversion module 202, a channelized radio carrier external device interface 204B, the antenna side interface 206, the optional processor 208, the optional memory 210, and the optional power supply 212. Channelized radio carrier signal interface unit 102B includes similar components to general signal interface unit 102A and operates according to similar principles and methods as general signal interface unit 102A.

The difference between channelized radio carrier signal interface unit 102B and general signal interface unit 102A is that the channelized radio carrier signal interface unit 102B is a more specific embodiment that interfaces with a channelized radio carrier base station unit 108B using a channelized radio carrier external device interface 204B. Further the channelized radio carrier signal interface unit 102B includes a signal conversion module 202 that converts between channelized radio carrier signals and the radio system signals used for transport in the distributed antenna system 100 network.

In the downlink, the channelized radio carrier external device interface 204B is configured to receive downlink channelized radio carrier signals from the channelized radio carrier base station unit 108B. The signal conversion module 202 is configured to convert the received downlink channelized radio carrier signals to a downlink radio system signal. In exemplary embodiments, the signal conversion module 202 and/or the antenna side interface 206 converts the radio system signal from electrical signals to optical signals for output on communication link 112. In other embodiments, the radio system signal is transported using a conductive communication medium, such as coaxial cable or twisted pair, and the optical conversion is not necessary. The antenna side interface 206 is configured to communicate the downlink radio system signal on communication link 112.

In exemplary embodiments, the signal conversion module 202 is further configured to adjust a downlink attribute of the downlink radio system signal based on differences in attributes and/or performance characteristics of the channelized radio carrier base station unit 108B and the channelized radio carrier signal interface unit 102B and/or distributed antenna system 100. In exemplary embodiments, the signal conversion module 202 adjusts at least one of these downlink attributes based on requirements set by the channelized radio carrier base station unit 108B and knowledge about the attributes and/or performance characteristics of the distributed antenna system 100's effect on the downlink signals. This enables the distributed antenna system 100 to distribute downlink radio system signals to at least one antenna unit 104 that will then be broadcast to at least one subscriber unit 118 and appear as if it were transmitted directly from a radio head connected to the channelized radio carrier base station unit 108B. This enables the distributed antenna system 100 to appear transparent to the at least one subscriber unit 118 in the downlink.

In exemplary embodiments, the at least one downlink attribute of the downlink radio system signal includes a power level, gain, noise floor, and/or delay. In exemplary embodiments where the at least one downlink attribute includes a delay, delays to individual antennas within the distributed antenna system 100 are detected, additional delay is added to the downlink delays for all except the longest delays to normalize and/or equalize the delays in the distributed antenna system 100, and the combined delay-equalized signal is presented to the channelized radio carrier base station unit 108B as if it were a single signal with a single delay value.

In exemplary embodiments, the downlink channelized radio carrier data is specific to a particular channel and requires additional channelized radio carrier conversion before radio frequency conversion and transmission can be performed. In exemplary embodiments, the downlink radio system signal is not specific to a particular channel and does not require additional channelized radio carrier conversion before radio frequency conversion and transmission can be performed. In exemplary embodiments, the downlink radio system signal contains an individual channel that is positioned within a set of spectrum that reflects its eventual location within radio frequency spectrum. In exemplary embodiments, the downlink radio system signal interface is communicatively coupled with an intermediary device that aggregates the downlink radio system signal with at least one other downlink radio system signal before being transmitted to at least one antenna unit 104. In exemplary embodiments, the individual channels within the downlink radio system signal and the at least one other downlink radio system signal do not overlap and can be upconverted together simultaneously to radio frequency spectrum.

In the uplink, antenna side interface 206 is configured to receive an uplink radio system signal from communication link 112. In exemplary embodiments where communication link 112 is an optical medium, the antenna side interface 206 and/or the signal conversion module 202 is configured to convert the uplink radio system signal between received optical signals and electrical signals. In other embodiments, the radio system signal is transported using a conductive communication medium, such as coaxial cable or twisted pair, and the optical conversion is not necessary. The signal conversion module 202 is further configured to convert the uplink radio system signal to uplink channelized radio carrier signals. Channelized radio carrier external device interface 204B is configured to communicate the uplink channelized radio carrier signals to the channelized radio carrier base station unit 108B.

In the uplink of exemplary embodiments, the signal conversion module 202 is further configured to adjust an uplink attribute of the uplink radio system signal based on differences in attributes and/or performance characteristics of the channelized radio carrier base station unit 108B and the channelized radio carrier signal interface unit 102B and/or distributed antenna system 100. In exemplary embodiments, the signal conversion module 202 adjusts at least one of these uplink attributes based on requirements set by the channelized radio carrier base station unit 108B and knowledge about the attributes and/or performance characteristics of the distributed antenna system 100's effect on the uplink signals. This enables the distributed antenna system 100 to receive uplink radio system signals from at least one antenna unit 104 that were received from at least one subscriber unit 118 and appear as if it were received directly at a radio head connected to the channelized radio carrier base station unit 108B. This enables the distributed antenna system 100 to appear transparent to the at least one channelized radio carrier base station unit 108B in the uplink.

In exemplary embodiments, the at least one uplink attribute of the uplink radio system signal includes a power level, gain, uplink noise floor, and/or delay. In exemplary embodiments where the at least one uplink attribute includes a power level, gain, and/or noise floor, the uplink gains from individual antennas are scaled by a factor of 1/N, where N is the number of antennas belonging to that simulcast group. The individual amplitude-adjusted signals are then combined into a composite uplink signal and the summed signal is scaled so that either the composite signal level or the composite noise floor matches what the channelized radio carrier base station unit 108B expects to see from a single antenna. The combined gain-equalized signal is presented to the channelized radio carrier base station unit 108B as if it were a single signal with a single gain and/or noise floor value. In exemplary embodiments where the at least one uplink attribute includes a delay, delays to individual antennas within the distributed antenna system 100 are detected, additional delay is added to the uplink delays for all except the longest delays to normalize and/or equalize the delays in the distributed antenna system 100, and the combined delay-equalized signal is presented to the channelized radio carrier base station unit 108B as if it were a single signal with a single delay value.

In exemplary embodiments, the uplink radio system signal contains an individual channel that is positioned within a set of spectrum that reflects its eventual location within radio frequency spectrum. In exemplary embodiments, the channelized radio carrier signal interface unit 102B is communicatively coupled with an intermediary device that separates the uplink radio system signal from an aggregate uplink radio system signal received from at least one antenna unit 104 and including at least one other uplink radio system signal. In exemplary implementations, the individual channels within the uplink radio system signal and the at least one other uplink radio system signal do not overlap and can be downconverted together simultaneously from radio frequency spectrum. In exemplary embodiments, the uplink radio system signal is not specific to a particular channel and does not require any channelized radio carrier processing when converted from radio frequency, while uplink channelized data is specific to a particular channel and requires channelized radio carrier processing when being converted from radio frequency.

In exemplary embodiments, an optional network interface clock unit is communicatively coupled to an external device clock unit of the channelized radio carrier base station unit 108B and a master reference clock is provided as described above with reference to FIG. 2A.

Figure 2C:
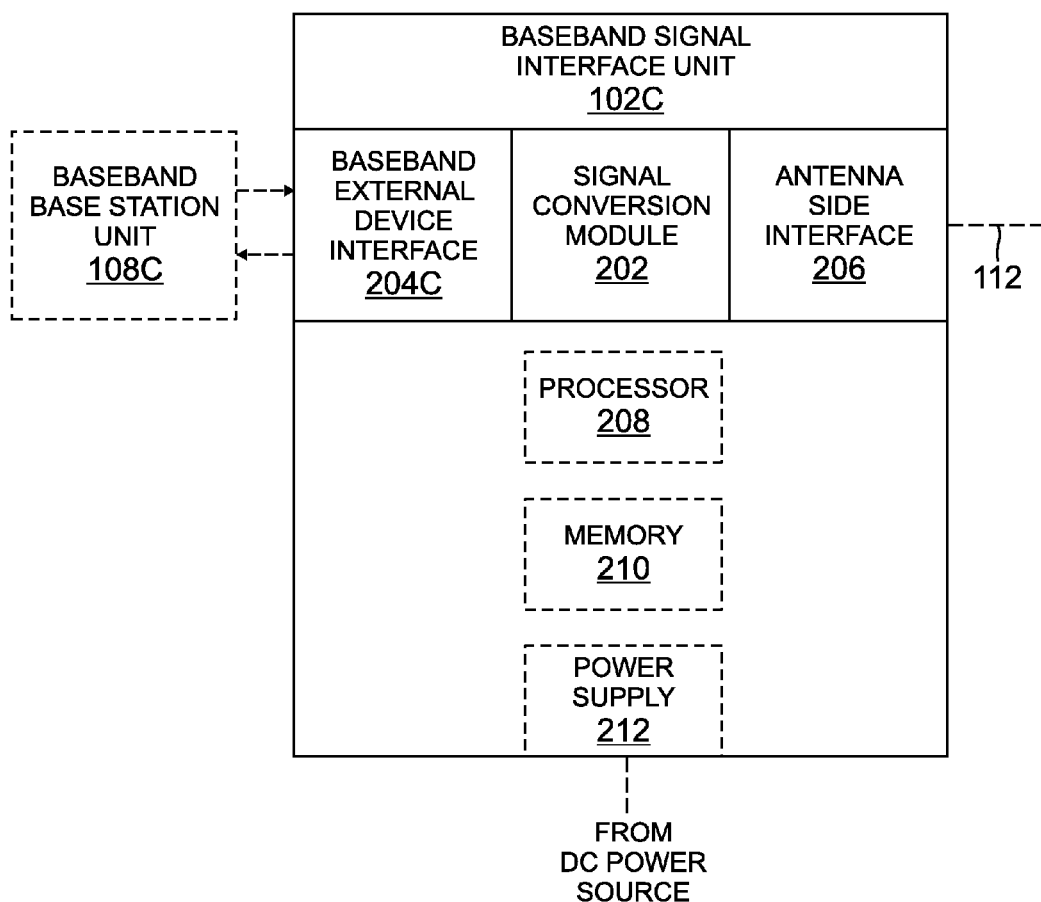

FIG. 2C is a block diagram of an exemplary embodiment of a type of signal interface unit 102, baseband signal interface unit 102C. Baseband signal interface unit 102C includes a signal conversion module 202, a baseband external device interface 204C, the antenna side interface 206, the optional processor 208, the optional memory 210, and the optional power supply 212. Baseband signal interface unit 102C includes similar components to general signal interface unit 102A and operates according to similar principles and methods as general signal interface unit 102A. The difference between baseband signal interface unit 102C and general signal interface unit 102A is that the baseband signal interface unit 102C is a more specific embodiment that interfaces with a baseband base station 108C using a baseband external device interface 204C. Further the baseband signal interface unit 102C includes a signal conversion module 202 that converts between baseband signals and the radio system signals used for transport in the distributed antenna system 100 network.

In the downlink, the baseband external device interface 204C is configured to receive downlink baseband signals from the baseband base station 108C. The signal conversion module 202 is configured to convert the received downlink baseband signals to a downlink radio system signal. In exemplary embodiments, the signal conversion module 202 and/or the antenna side interface 206 converts the radio system signal from electrical signals to optical signals for output on communication link 112. In other embodiments, the radio system signal is transported using a conductive communication medium, such as coaxial cable or twisted pair, and the optical conversion is not necessary. The antenna side interface 206 is configured to communicate the downlink radio system signal on communication link 112.

In exemplary embodiments, the signal conversion module 202 is further configured to adjust a downlink attribute of the downlink radio system signal based on differences in attributes and/or performance characteristics of the baseband base station 108C and the baseband signal interface unit 102C and/or distributed antenna system 100. In exemplary embodiments, the signal conversion module 202 adjusts at least one of these downlink attributes based on requirements set by the baseband base station 108C and knowledge about the attributes and/or performance characteristics of the distributed antenna system 100's effect on the downlink signals. This enables the distributed antenna system 100 to distribute downlink radio system signals to at least one antenna unit 104 that will then be broadcast to at least one subscriber unit 118 and appear as if it were transmitted directly from a radio head connected to the baseband base station 108C. This enables the distributed antenna system 100 to appear transparent to the at least one subscriber unit 118 in the downlink.

In exemplary embodiments, the at least one downlink attribute includes a power level, gain, noise floor, and/or delay. In exemplary embodiments where the at least one downlink attribute includes a delay, delays to individual antennas within the distributed antenna system 100 are detected, additional delay is added to the downlink delays for all except the longest delays to normalize and/or equalize the delays in the distributed antenna system 100, and the combined delay-equalized signal is presented to the baseband base station 108C as if it were a single signal with a single delay value.

In exemplary embodiments, the downlink baseband data is specific to a particular channel and requires additional baseband conversion before radio frequency conversion and transmission can be performed. In exemplary embodiments, the downlink radio system signal is not specific to a particular channel and does not require additional baseband conversion before radio frequency conversion and transmission can be performed. In exemplary embodiments, the downlink radio system signal contains an individual channel that is positioned within a set of spectrum that reflects its eventual location within radio frequency spectrum. In exemplary embodiments, the downlink radio system signal interface is communicatively coupled with an intermediary device that aggregates the downlink radio system signal with at least one other downlink radio system signal before being transmitted to at least one antenna unit 104. In exemplary embodiments, the individual channels within the downlink radio system signal and the at least one other downlink radio system signal do not overlap and can be upconverted together simultaneously to radio frequency spectrum.

In the uplink, antenna side interface 206 is configured to receive an uplink radio system signal from communication link 112. In exemplary embodiments where communication link 112 is an optical medium, the antenna side interface 206 and/or the signal conversion module 202 is configured to convert the uplink radio system signal between received optical signals and electrical signals. In other embodiments, the radio system signal is transported using a conductive communication medium, such as coaxial cable or twisted pair, and the optical conversion is not necessary. The signal conversion module 202 is further configured to convert the uplink radio system signal to uplink baseband signals. Baseband external device interface 204C is configured to communicate the uplink baseband signals to the baseband base station 108C.

In the uplink of exemplary embodiments, the signal conversion module 202 is further configured to adjust an uplink attribute of the uplink radio system signal based on differences in attributes and/or performance characteristics of the baseband base station 108C and the baseband signal interface unit 102C and/or distributed antenna system 100. In exemplary embodiments, the signal conversion module 202 adjusts at least one of these uplink attributes based on requirements set by the baseband base station 108C and knowledge about the attributes and/or performance characteristics of the distributed antenna system 100's effect on the uplink signals. This enables the distributed antenna system 100 to receive uplink radio system signals from at least one antenna unit 104 that were received from at least one subscriber unit 118 and appear as if it were received directly at a radio head connected to the baseband base station 108C. This enables the distributed antenna system 100 to appear transparent to the at least one baseband base station 108C in the uplink.

In exemplary embodiments, the at least one uplink attribute includes a power level, gain, uplink noise floor, and/or delay. In exemplary embodiments where the at least one uplink attribute includes a power level, gain, and/or noise floor, the uplink gains from individual antennas are scaled by a factor of 1/N, where N is the number of antennas belonging to that simulcast group. The individual amplitude-adjusted signals are then combined into a composite uplink signal and the summed signal is scaled so that either the composite signal level or the composite noise floor matches what the baseband base station 108C expects to see from a single antenna. The combined gain-equalized signal is presented to the baseband base station 108C as if it were a single signal with a single gain and/or noise floor value. In exemplary embodiments where the at least one uplink attribute includes a delay, delays to individual antennas within the distributed antenna system 100 are detected, additional delay is added to the uplink delays for all except the longest delays to normalize and/or equalize the delays in the distributed antenna system 100, and the combined delay-equalized signal is presented to the baseband base station 108C as if it were a single signal with a single delay value.

In exemplary embodiments, the uplink radio system signal contains an individual channel that is positioned within a set of spectrum that reflects its eventual location within radio frequency spectrum. In exemplary embodiments, the baseband signal interface unit 102C is communicatively coupled with an intermediary device that separates the uplink radio system signal from an aggregate uplink radio system signal received from at least one antenna unit 104 and including at least one other uplink radio system signal. In exemplary implementations, the individual channels within the uplink radio system signal and the at least one other uplink radio system signal do not overlap and can be downconverted together simultaneously from radio frequency spectrum. In exemplary embodiments, the uplink radio system signal is not specific to a particular channel and does not require any baseband processing when converted from radio frequency, while uplink channelized data is specific to a particular channel and requires baseband processing when being converted from radio frequency.

In exemplary embodiments, an optional network interface clock unit is communicatively coupled to an external device clock unit of the baseband base station 108C and a master reference clock is provided as described above with reference to FIG. 2A.

Figure 2D:
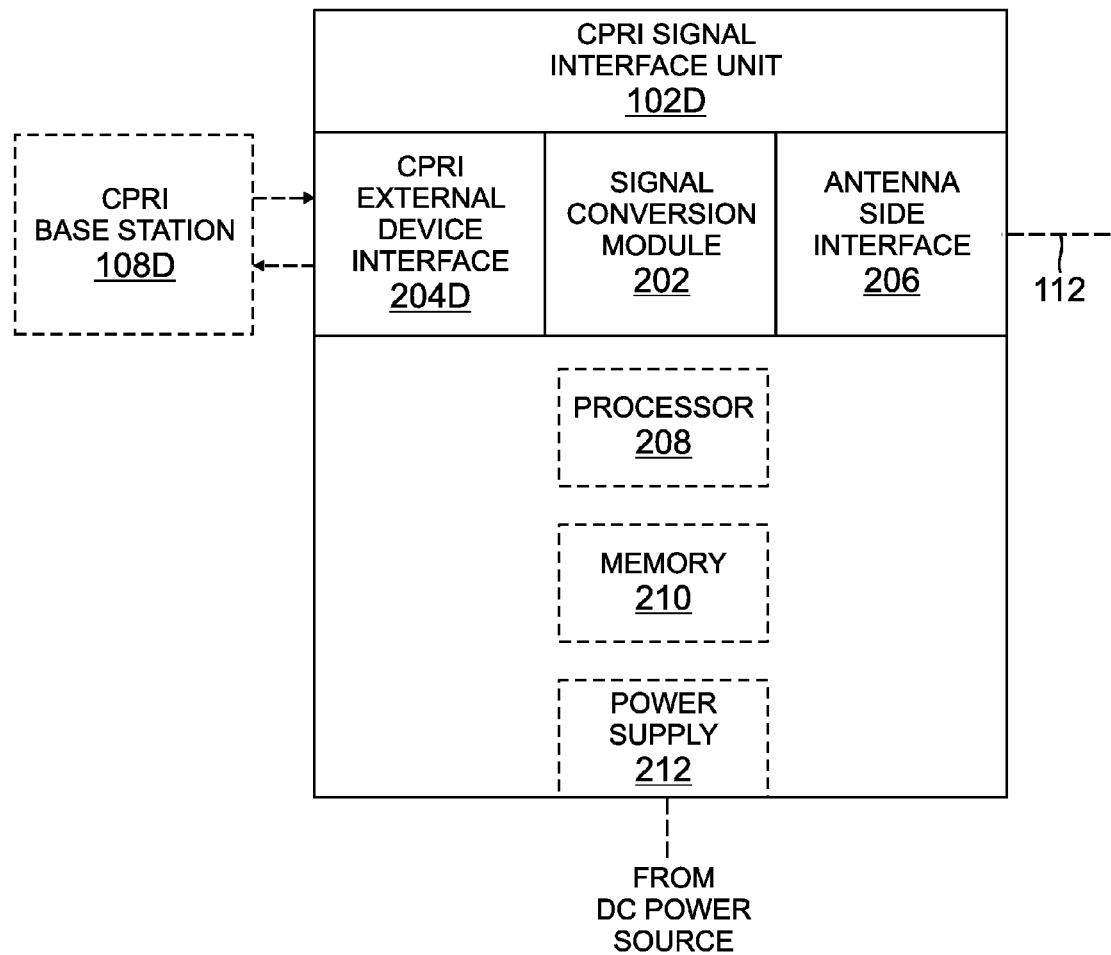

FIG. 2D is a block diagram of an exemplary embodiment of a type of signal interface unit 102, Common Public Radio Interface (CPRI) signal interface unit 102D. CPRI signal interface unit 102D includes a signal conversion module 202, a CPRI external device interface 204D, the antenna side interface 206, the optional processor 208, the optional memory 210, and the optional power supply 212. CPRI signal interface unit 102D includes similar components to general signal interface unit 102A and operates according to similar principles and methods as general signal interface unit 102A. The difference between CPRI signal interface unit 102D and general signal interface unit 102A is that the CPRI signal interface unit 102D is a more specific embodiment that interfaces with a CPRI base station 108D using a CPRI external device interface 204D. Further, the CPRI signal interface unit 102D includes a signal conversion module 202 that converts between CPRI signals and the radio system signals used for transport in the distributed antenna system 100 network.

In the downlink, the CPRI external device interface 204D is configured to receive downlink CPRI signals from the CPRI base station 108D. The signal conversion module 202 is configured to convert the received downlink CPRI signals to a downlink radio system signal. In exemplary embodiments, the signal conversion module 202 and/or the antenna side interface 206 converts the radio system signal from electrical signals to optical signals for output on communication link 112. In other embodiments, the radio system signal is transported using a conductive communication medium, such as coaxial cable or twisted pair, and the optical conversion is not necessary. The antenna side interface 206 is configured to communicate the downlink radio system signal on communication link 112.

In exemplary embodiments, the signal conversion module 202 is further configured to adjust a downlink attribute of the downlink radio system signal based on differences in attributes and/or performance characteristics of the CPRI base station unit 108D and the CPRI signal interface unit 102D and/or distributed antenna system 100. In exemplary embodiments, the signal conversion module 202 adjusts at least one of these downlink attributes based on requirements set by the CPRI base station unit 108D and knowledge about the attributes and/or performance characteristics of the distributed antenna system 100's effect on the downlink signals. This enables the distributed antenna system 100 to distribute downlink radio system signals to at least one antenna unit 104 that will then be broadcast to at least one subscriber unit 118 and appear as if it were transmitted directly from a radio head connected to the CPRI base station 108D. This enables the distributed antenna system 100 to appear transparent to the at least one subscriber unit 118 in the downlink.

In exemplary embodiments, the at least one downlink attribute includes a power level, gain, noise floor, and/or delay. In exemplary embodiments where the at least one downlink attribute includes a delay, delays to individual antennas within the distributed antenna system 100 are detected, additional delay is added to the downlink delays for all except the longest delays to normalize and/or equalize the delays in the distributed antenna system 100, and the combined delay-equalized signal is presented to the external device as if it were a single signal with a single delay value.

In exemplary embodiments, the downlink baseband data is specific to a particular channel and requires additional baseband conversion before radio frequency conversion and transmission can be performed. In exemplary embodiments, the downlink radio system signal is not specific to a particular channel and does not require additional baseband conversion before radio frequency conversion and transmission can be performed. In exemplary embodiments, the downlink radio system signal contains an individual channel that is positioned within a set of spectrum that reflects its eventual location within radio frequency spectrum. In exemplary embodiments, the downlink radio system signal interface is communicatively coupled with an intermediary device that aggregates the downlink radio system signal with at least one other downlink radio system signal before being transmitted to at least one antenna unit 104. In exemplary embodiments, the individual channels within the downlink radio system signal and the at least one other downlink radio system signal do not overlap and can be upconverted together simultaneously to radio frequency spectrum.

In the uplink, antenna side interface 206 is configured to receive an uplink radio system signal from communication link 112. In exemplary embodiments where communication link 112 is an optical medium, the antenna side interface 206 and/or the signal conversion module 202 is configured to convert the uplink radio system signal between received optical signals and electrical signals. In other embodiments, the radio system signal is transported using a conductive communication medium, such as coaxial cable or twisted pair, and the optical conversion is not necessary. The signal conversion module 202 is further configured to convert the uplink radio system signal to uplink CPRI signals. CPRI external device interface 204D is configured to communicate the uplink signals to the CPRI base station 108D.

In the uplink of exemplary embodiments, the signal conversion module 202 is further configured to adjust an uplink attribute of the uplink radio system signal based on differences in attributes and/or performance characteristics of the CPRI base station 108D and the CPRI signal interface unit 102D and/or distributed antenna system 100. In exemplary embodiments, the signal conversion module 202 adjusts at least one of these uplink attributes based on requirements set by the CPRI base station 108D and knowledge about the attributes and/or performance characteristics of the distributed antenna system 100's affect on the uplink signals. This enables the distributed antenna system 100 to receive uplink radio system signals from at least one antenna unit 104 that were received from at least one subscriber unit 118 and appear as if it were received directly at a radio head connected to the CPRI base station 108D. This enables the distributed antenna system 100 to appear transparent to the at least one CPRI base station 108D in the uplink.

In exemplary embodiments, the at least one uplink attribute includes a power level, gain, uplink noise floor, and/or delay. In exemplary embodiments where the at least one uplink attribute includes a power level, gain, and/or noise floor, the uplink gains from individual antennas are scaled by a factor of 1/N, where N is the number of antennas belonging to that simulcast group. The individual amplitude-adjusted signals are then combined into a composite uplink signal and the summed signal is scaled so that either the composite signal level or the composite noise floor matches what the CPRI base station 108D expects to see from a single antenna. The combined gain-equalized signal is presented to the CPRI base station 108D as if it were a single signal with a single gain and/or noise floor value. In exemplary embodiments where the at least one uplink attribute includes a delay, delays to individual antennas within the distributed antenna system 100 are detected, additional delay is added to the uplink delays for all except the longest delays to normalize and/or equalize the delays in the distributed antenna system 100, and the combined delay-equalized signal is presented to the CPRI base station 108D as if it were a single signal with a single delay value.

In exemplary embodiments, the uplink radio system signal contains an individual channel that is positioned within a set of spectrum that reflects its eventual location within radio frequency spectrum. In exemplary embodiments, the CPRI signal interface unit 102D is communicatively coupled with an intermediary device that separates the uplink radio system signal from an aggregate uplink radio system signal received from at least one antenna unit 104 and including at least one other uplink radio system signal. In exemplary implementations, the individual channels within the uplink radio system signal and the at least one other uplink radio system signal do not overlap and can be downconverted together simultaneously from radio frequency spectrum. In exemplary embodiments, the uplink radio system signal is not specific to a particular channel and does not require any baseband processing when converted from radio frequency, while uplink channelized data is specific to a particular channel and requires baseband processing when being converted from radio frequency.

In exemplary embodiments, an optional network interface clock unit is communicatively coupled to an external device clock unit of the CPRI base station 108D and a master reference clock is provided as described above with reference to FIG. 2A.

Figure 3:
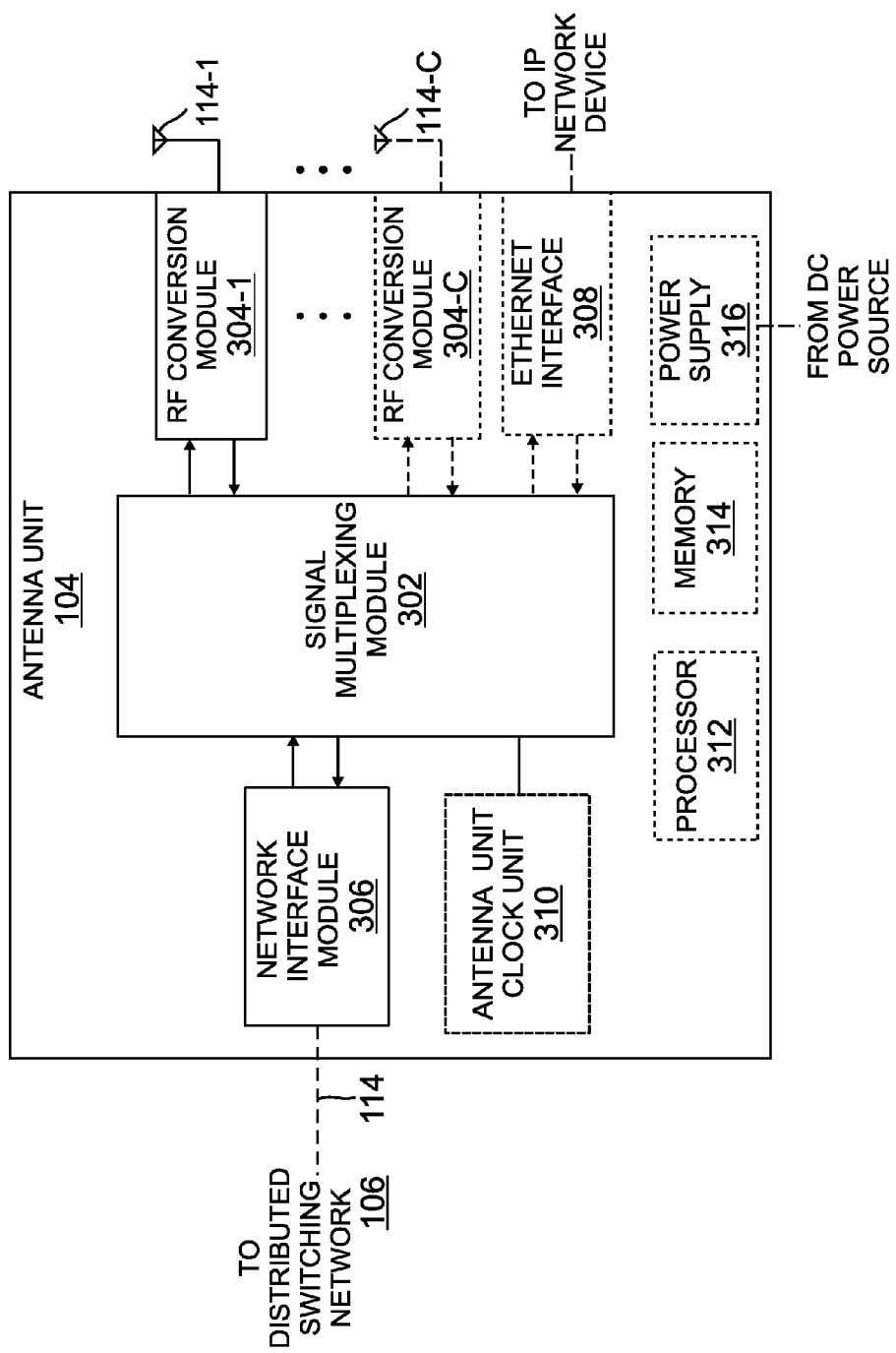
FIG. 3 is a block diagram of an exemplary embodiment of an antenna unit used in distributed antenna systems, such as the exemplary distributed antenna system in FIG. 1.

FIG. 3 is a block diagram of an exemplary embodiment of an antenna unit 104 used in distributed antenna systems, such as exemplary distributed antenna system 100 described above. The antenna unit 104 includes a signal multiplexing module 302, at least one radio frequency (RF) conversion module 304 (including RF conversion module 304-1 and any amount of optional RF conversion modules 304 through optional RF conversion module 304-C), network interface module 306, optional Ethernet interface 308, optional antenna unit clock unit 310, optional processor 312, optional memory 314, and optional power supply 316. In exemplary embodiments, signal multiplexing module 302, at least one RF conversion module 304, and/or the network interface module 306 are implemented at least in part by optional processor 312 and optional memory 314. In exemplary embodiments, optional power supply 316 is used to power the various components of the antenna unit 104.

In exemplary embodiments, signal multiplexing module 302 receives at least one downlink radio system signal from at least one signal interface unit 102 through the distributed switching network 106. In exemplary embodiments, the at least one downlink radio system signal is received through the network interface module 306. In exemplary embodiments where the downlink radio system signal is an optical signal, the network interface module 306 converts the downlink radio system signal from an optical format to an electrical format. In exemplary embodiments, more input lines and/or more network interface module 306 are included in the antenna unit 104. In exemplary embodiments, the signal multiplexing module 302 splits apart an aggregate downlink radio system signal into at least one downlink radio system signal that is sent to RF conversion module 304-1 for eventual transmission as a radio frequency on radio frequency antenna 116-1. In exemplary embodiments, the signal multiplexing module 302 splits apart the aggregate downlink radio system signal into a plurality of downlink radio system signals that are sent to a plurality of RF conversion modules 304 for eventual transmission as radio frequency signals at radio frequency antennas 116.

In exemplary embodiments, signal multiplexing module 302 receives at least one uplink radio system signal from at least one RF conversion module 304. In exemplary embodiments, the signal multiplexing module 302 receives a plurality of uplink radio system signals from a plurality of RF conversion modules 304. In exemplary embodiments, the radio system signal multiplexing unit aggregates at least one uplink radio system signal received from an RF conversion module 304-1 with another uplink radio system signal received from another RF conversion module 304. In exemplary embodiments, the signal multiplexing module 302 aggregates a plurality of uplink radio system signals into a single aggregate uplink radio system signal. In exemplary embodiments, the aggregate uplink radio system signal is provided to network interface module 306 which converts the aggregate uplink radio system signal from electrical signals to optical signals before communicating the aggregate uplink radio system signal to the distributed switching network 106 through the distributed switching network 106. In other embodiments, the aggregate uplink radio system signal is communicated as electrical signals toward the distributed switching network 106. In exemplary embodiments, the aggregate uplink signal is converted to optical signals at another place in the distributed antenna system 100.

In exemplary embodiments, the optional Ethernet interface 308 receives a downlink radio system signal from the signal multiplexing module 302 and converts it to Ethernet packets and communicates the Ethernet packets with an internet protocol network device. The optional Ethernet interface 308 also receives Ethernet packets from the internet protocol network device and converts them to an uplink radio system signal and communicates it to the signal multiplexing module 302. In exemplary embodiments having the optional Ethernet interface 308, a corresponding external device 108 that is an Ethernet interface interfaces with a signal interface unit 102 that is an Ethernet interface.

In exemplary embodiments, the optional antenna unit clock unit 310 extracts the master reference clock from the downlink radio system signal and uses this master clock within the antenna unit 104 to establish a common time base in the antenna unit 104 with the rest of the distributed antenna system 100. In exemplary embodiments, the optional antenna unit clock unit 310 generates a master reference clock and distributes the generated master reference clock to other components of the distributed antenna system 100 (and even the external devices 108) in the upstream using the uplink radio system signal.

Figure 4A:
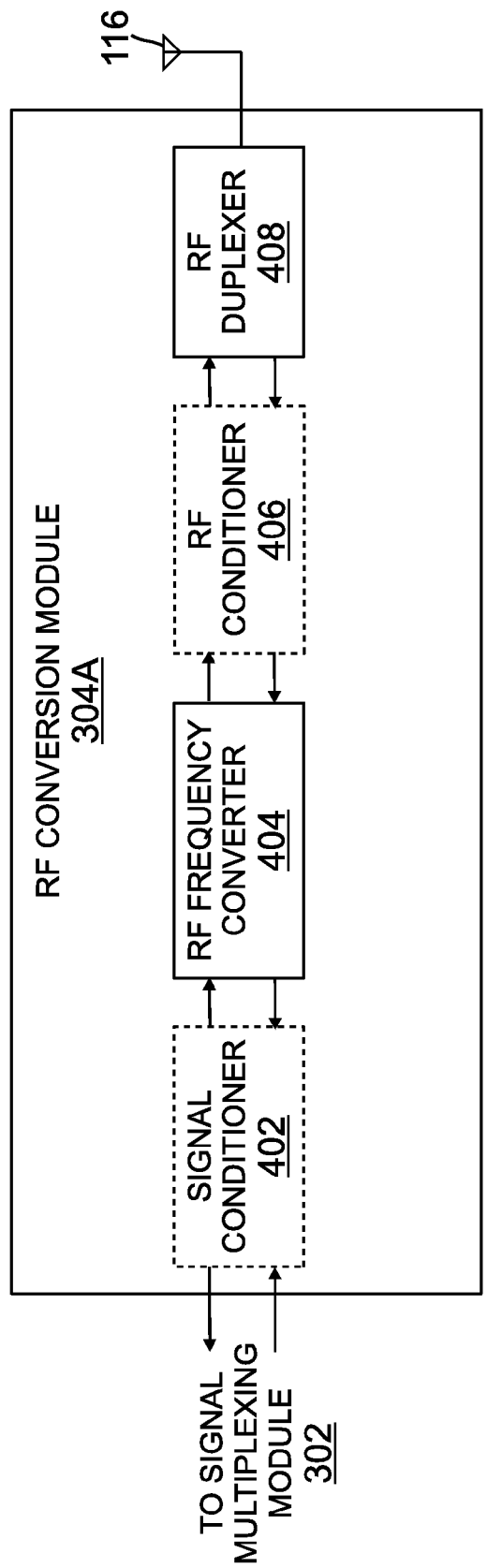
FIGS. 4A-4C are block diagrams of exemplary embodiments of RF conversion modules used in antenna units of distributed antenna systems, such as the exemplary antenna unit in FIG. 3.
Figure 4B:
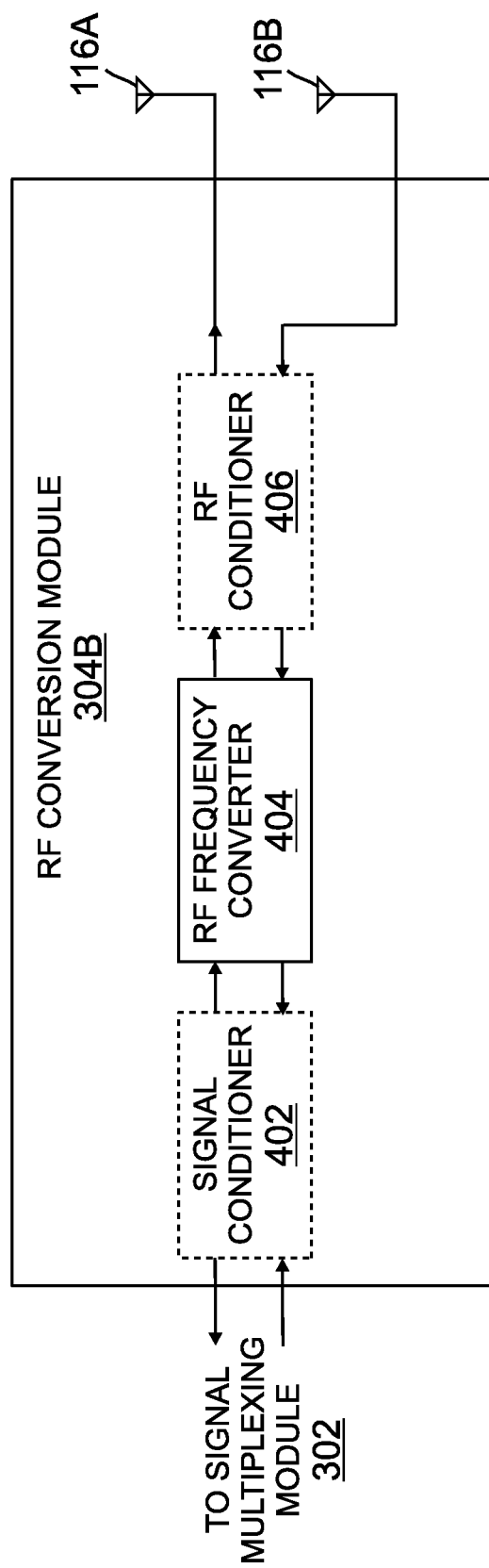
Figure 4C:
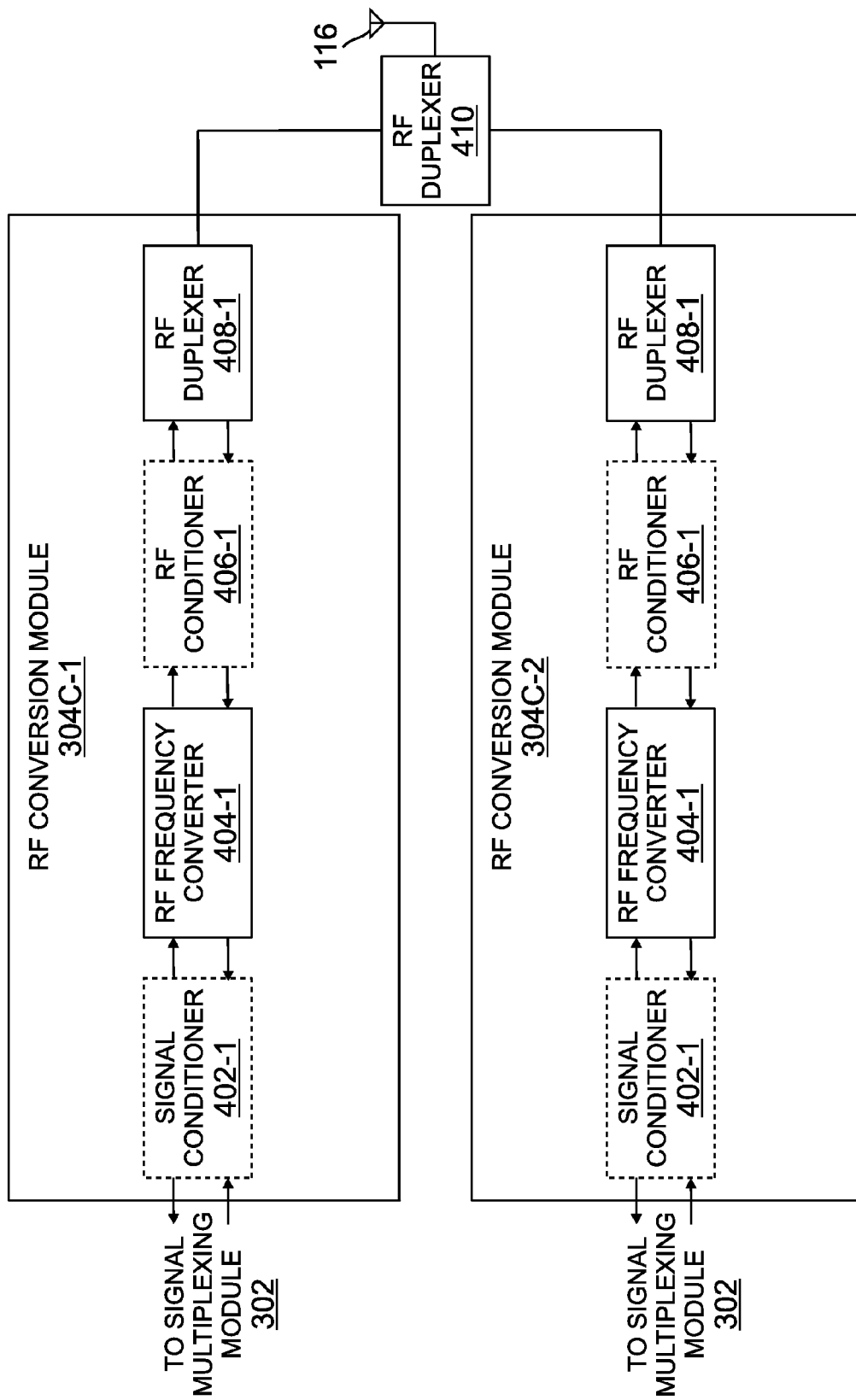

FIGS. 4A-4C are block diagrams of exemplary embodiments of RF conversion modules 304 used in antenna units of distributed antenna systems, such as the exemplary antenna unit 104 described above. Each of FIGS. 4A-4C are block diagrams of exemplary embodiments of RF conversion module 304, labeled RF conversion module 304A-304C respectively.

FIG. 4A is a block diagram of an exemplary RF conversion module 304A including an optional radio system signal conditioner 402, a radio frequency (RF) converter 404, an optional RF conditioner 406, and an RF duplexer 408 coupled to a single radio frequency antenna 116.

The optional radio system signal conditioner 402 is communicatively coupled to a signal multiplexing module 302 and the RF converter 404. In the forward path, the optional radio system signal conditioner 402 conditions the downlink radio system signal (for example, through amplification, attenuation, and filtering) received from the signal multiplexing module 302 and passes the downlink radio system signal to the RF converter 404. In the reverse path, the optional radio system signal conditioner 402 conditions the uplink radio system signal (for example, through amplification, attenuation, and filtering) received from the RF converter 404 and passes the uplink radio system signal to the signal multiplexing module 302.

The RF converter 404 is communicatively coupled to either the signal multiplexing module 302 or the optional radio system signal conditioner 402 on one side and to either RF duplexer 408 or the optional RF conditioner 406 on the other side. In the downstream, the RF converter 404 converts a downlink radio system signal to downlink radio frequency (RF) signals and passes the downlink RF signals onto either the RF duplexer 408 or the optional RF conditioner 406. In the upstream, the RF converter 404 converts uplink radio frequency (RF) signals received from either the RF duplexer 408 or the optional RF conditioner 406 to an uplink radio system signal and passes the uplink radio system signal to either the signal multiplexing module 302 or the optional radio system signal conditioner 402.

The RF duplexer 408 is communicatively coupled to either the RF converter 404 or the optional RF conditioner 406 on one side and the radio frequency antenna 116 on the other side. The RF duplexer 408 duplexes the downlink RF signals with the uplink RF signals for transmission/reception using the radio frequency antenna 116. In exemplary embodiments, the downlink and uplink signals within a radio frequency band are distinct in spectrum and are separated in a frequency using a Frequency Division Duplexing (FDD) scheme. In other embodiments, either or both of the downlink and uplink signals within the radio frequency band are separated in time using a Time Division Duplexing (TDD) scheme. In exemplary embodiments, downlink and uplink signals within a radio frequency band overlap in spectrum and are separated in time using a Time Division Duplexing (TDD) scheme.

FIG. 4B is a block diagram of an exemplary RF conversion module 304B including an optional radio system signal conditioner 402, an RF converter 404, and an optional RF conditioner 406 coupled to a downlink radio frequency antenna 116A and an uplink radio frequency antenna 116B. RF conversion module 304B includes similar components to RF conversion module 304A and operates according to similar principles and methods as RF conversion module 304A described above. The difference between RF conversion module 304B and RF conversion module 304A is that RF conversion module 304B does not include RF duplexer 408 and instead includes separate downlink radio frequency antenna 116A used to transmit RF signals to at least one subscriber unit and uplink radio frequency antenna 116B used to receive RF signals from at least one subscriber unit.

FIG. 4C is a block diagram of an exemplary RF conversion module 304C-1 and exemplary RF conversion module 304C-2 that share a single radio frequency antenna 116 through an RF diplexer 410. The RF conversion module 304C-1 includes an optional radio system signal conditioner 402-1, an RF converter 404-1, an optional RF conditioner 406-1, and an RF duplexer 408-1 communicatively coupled to RF diplexer 410 that is communicatively coupled to radio frequency antenna 116. Similarly, the RF conversion module 304C-2 includes an optional radio system signal conditioner 402-2, an RF converter 404-2, an optional RF conditioner 406-2, and an RF duplexer 408-2 communicatively coupled to RF diplexer 410 that is communicatively coupled to radio frequency antenna 116. Each of RF conversion module 304C-1 and 304C-2 operate according to similar principles and methods as RF conversion module 304A described above. The difference between RF conversion modules 304C-1 and 304C-2 and RF conversion module 304A is that RF conversion modules 304C-1 and 304C-2 are both coupled to a single radio frequency antenna 116 through RF diplexer 410. The RF diplexer 410 diplexes the duplexed downlink and uplink signals for both RF conversion module 304C-1 and 304C-2 for transmission/reception using the single radio frequency antenna 116.

Figure 5:
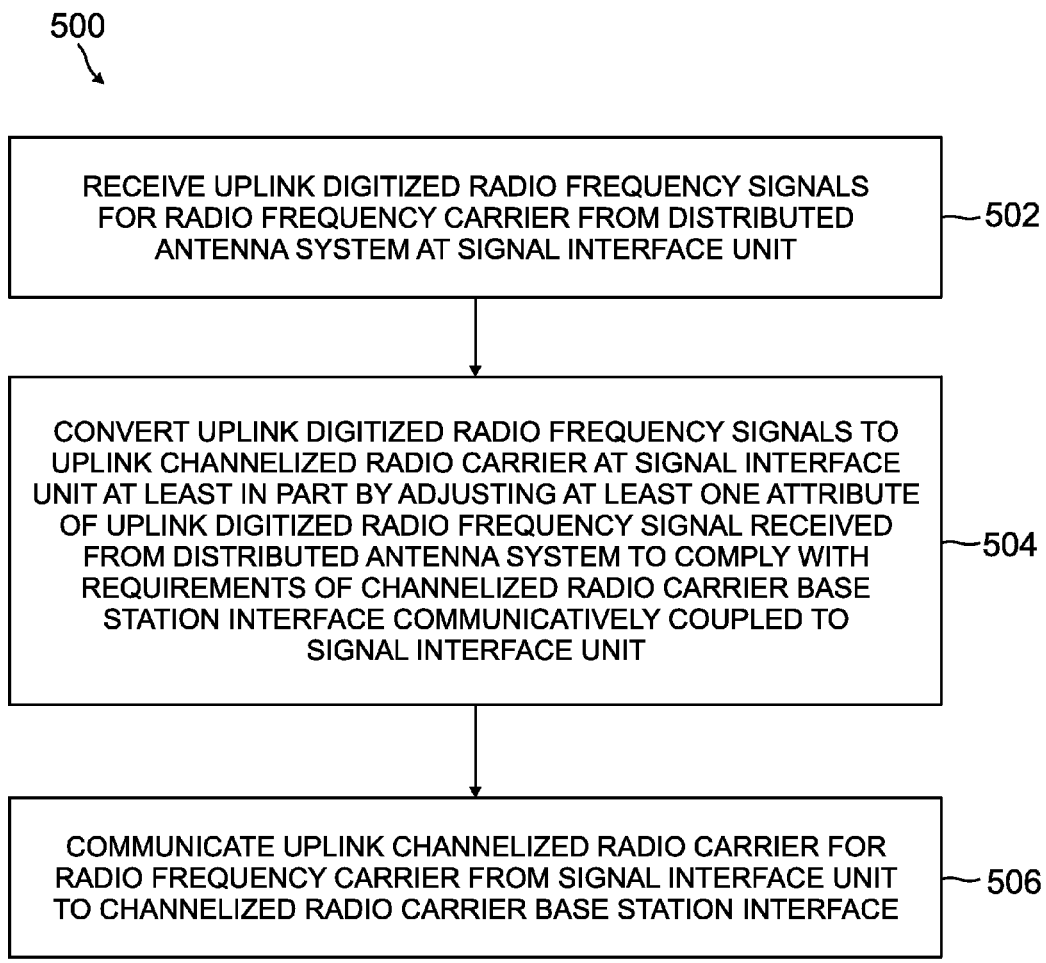
FIG. 5 is a flow diagram illustrating one exemplary embodiment of a method of making a distributed antenna system appear as a radio head in a digital radio system.

FIG. 5 is a flow diagram illustrating one exemplary embodiment of a method 1100 of making a distributed antenna system appear as a radio head in a digital radio system. Exemplary method 500 begins at block 502 with receiving uplink digitized radio frequency signals for a radio frequency carrier from the distributed antenna system at a signal interface unit.

Exemplary method 500 proceeds to block 504 with converting the uplink digitized radio frequency signals to an uplink channelized radio carrier at the signal interface unit at least in part by adjusting at least one uplink attribute of the uplink digitized radio frequency signal received from the distributed antenna system to comply with requirements of a channelized radio carrier base station interface communicatively coupled to the signal interface unit. In exemplary embodiments, the requirements of the channelized radio carrier base station interface are received at the signal conversion module from the channelized radio carrier base station interface. In exemplary embodiments, the at least one uplink attribute of the uplink digitized radio frequency signal includes a power level, a gain, a delay, and/or an uplink noise floor. In exemplary embodiments where the at least one uplink attribute includes a power level, gain, and/or noise floor, the uplink gains from individual antennas are scaled by a factor of 1/N, where N is the number of antennas belonging to that simulcast group. The individual amplitude-adjusted signals are then combined into a composite uplink signal and the summed signal is scaled so that either the composite signal level or the composite noise floor matches what the external device expects to see from a single antenna. The combined gain-equalized signal is presented to the external device as if it were a single signal with a single gain and/or noise floor value. In exemplary embodiments where the at least one uplink attribute includes a delay, delays to individual antennas within the distributed antenna system 100 are detected, additional delay is added to the uplink delays for all except the longest delays to normalize and/or equalize the delays in the distributed antenna system 100, and the combined delay-equalized signal is presented to the external device as if it were a single signal with a single delay value. In exemplary embodiments, adjusting the at least one uplink attribute of the uplink digitized radio frequency signal received from the distributed antenna system to comply with requirements of the channelized radio carrier base station interface includes scaling the uplink noise floor of the uplink digitized radio frequency signal to make the uplink noise floor comply with requirements for uplink noise floor of the channelized radio carrier base station interface.

Exemplary method 500 proceeds to block 506 with communicating the uplink channelized radio carrier for the radio frequency carrier from the signal interface unit to the channelized radio carrier base station interface. In exemplary embodiments, the uplink channelized radio carrier includes I/Q pairs.

Any of the processors described above may include or function with software programs, firmware or other computer readable instructions for carrying out various methods, process tasks, calculations, and control functions, described herein. These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

EXAMPLE EMBODIMENTS

Example 1 includes a signal interface unit for a distributed antenna system, comprising: a channelized radio carrier interface configured to communicate an uplink channelized radio carrier for a radio frequency carrier to a channelized radio carrier base station interface; an antenna side interface configured to receive an uplink digitized radio frequency signal from the distributed antenna system communicatively coupled to the antenna side interface; and a signal conversion module communicatively coupled between the channelized radio carrier interface and the antenna side interface and configured to convert between the uplink digitized radio frequency signal and the uplink channelized radio carrier at least in part by adjusting at least one uplink attribute of the uplink digitized radio frequency signal received from the distributed antenna system to comply with requirements of the channelized radio carrier base station interface.

Example 2 includes the signal interface unit of Example 1, wherein adjusting the at least one uplink attribute of the uplink digitized radio frequency signal received from the distributed antenna system to comply with requirements of the channelized radio carrier base station interface includes digitally adjusting the at least one uplink attribute.

Example 3 includes the signal interface unit of any of Examples 1-2, wherein adjusting the at least one uplink attribute of the uplink digitized radio frequency signal received from the distributed antenna system to comply with requirements of the channelized radio carrier base station interface includes digitally scaling an uplink gain of the uplink digitized radio frequency signal.

Example 4 includes the signal interface unit of any of Examples 1-3, wherein the signal conversion module is further configured to convert between the uplink digitized radio frequency signal and the uplink channelized radio carrier by converting between two distinct framing structures.

Example 5 includes the signal interface unit of any of Examples 1-4, wherein the signal conversion module is further configured to convert between the uplink digitized radio frequency signal and the uplink channelized radio carrier by converting from a digitized representation of radio frequency spectrum into a baseband channelized representation of the radio frequency spectrum.

Example 6 includes the signal interface unit of any of Examples 1-5, wherein the requirements of the channelized radio carrier base station interface are received at the signal conversion module from the channelized radio carrier base station interface.

Example 7 includes the signal interface unit of any of Examples 1-6, wherein the signal interface unit is configured to adjust characteristics reported to the channelized radio carrier base station interface based on the requirements of the channelized radio carrier base station interface.

Example 8 includes the signal interface unit of any of Examples 1-7, wherein the at least one uplink attribute of the uplink digitized radio frequency signal includes at least one of a power level, a gain, a delay, and an uplink noise floor.

Example 9 includes the signal interface unit of any of Examples 1-8, wherein adjusting the at least one uplink attribute of the uplink digitized radio frequency signal received from the distributed antenna system to comply with requirements of the channelized radio carrier base station interface includes scaling an uplink noise floor of the uplink digitized radio frequency signal to make the uplink noise floor comply with requirements for uplink noise floor of the channelized radio carrier base station interface.

Example 10 includes the signal interface unit of any of Examples 1-9, wherein the uplink channelized radio carrier includes I/Q pairs.

Example 11 includes the signal interface unit of any of Examples 1-10, wherein the distributed antenna system is a digital distributed antenna system that communicates digitized radio frequency signals between the signal interface unit and an antenna unit where the digitized radio frequency signals are converted to radio frequency signals and transmitted to a subscriber unit.

Example 12 includes the signal interface unit of any of Examples 1-11, wherein the distributed antenna system communicates the digitized radio frequency signals between the signal interface unit and the antenna unit across a wired medium.

Example 13 includes the signal interface unit of any of Examples 1-12, wherein the distributed antenna system is a hybrid distributed antenna system that communicates digitized radio frequency signals between the signal interface unit and an intermediary device, converts between digitized radio frequency signals and analog signals at the intermediary device, and communicates the analog signals from the intermediary device to an antenna unit where the analog signals are converted to radio frequency signals and transmitted to a subscriber unit.

Example 14 includes the signal interface unit of any of Examples 1-13, wherein the distributed antenna system communicates the digitized radio frequency signals between the signal interface unit and the intermediary device across a wired medium.

Example 15 includes the signal interface unit of any of Examples 1-14, wherein the distributed antenna system communicates the digitized radio frequency signals between the intermediary device and the antenna unit across a wired medium.

Example 16 includes the signal interface unit of any of Examples 1-15, wherein the channelized radio carrier interface is further configured to receive a downlink channelized radio carrier for a second radio frequency carrier from a channelized radio carrier base station interface; wherein the antenna side interface is configured to communicate a downlink digitized radio frequency signal from the antenna side interface to the distributed antenna system; and wherein the signal conversion module is further configured to convert between the downlink channelized radio carrier and the downlink digitized radio frequency signal at least in part by adjusting at least one downlink attribute of the downlink digitized radio frequency signal to comply with requirements of the channelized radio carrier base station interface.

Example 17 includes a signal interface unit for an antenna system, comprising: an external device interface configured to communicate a first uplink signal to an external device; an antenna side interface configured to receive a second uplink signal from an antenna unit communicatively coupled to the antenna side interface; a signal conversion module communicatively coupled between the external device interface and the antenna side interface and configured to convert from the second uplink signal to the first uplink signal at least in part by digitally adjusting at least one uplink attribute of the second uplink signal received from the antenna side interface to comply with requirements of the external device.

Example 18 includes the signal interface unit of Example 17, wherein adjusting the at least one uplink attribute of the second uplink signal received from the antenna side interface to comply with requirements of the external device includes digitally scaling an uplink gain of the second uplink signal.

Example 19 includes the signal interface unit of any of Examples 17-18, wherein the signal conversion module is further configured to convert between the second uplink signal and the first uplink signal by converting between two distinct framing structures.

Example 20 includes the signal interface unit of any of Examples 17-19, wherein the signal conversion module is further configured to convert between the second uplink signal and the first uplink signal by converting from a digitized representation of radio frequency spectrum into a baseband channelized representation of the radio frequency spectrum.

Example 21 includes the signal interface unit of any of Examples 17-20, wherein the external device interface is a baseband signal interface unit.

Example 22 includes the signal interface unit of any of Examples 17-21, wherein the external device interface is at least one of a Common Public Radio Interface (CPRI) external device interface, an Open Base Station Architecture Initiative (OBSAI) external device interface, and an Open Radio Interface (ORI) external device interface.

Example 23 includes the signal interface unit of any of Examples 17-22, wherein the requirements of the external device are received at the signal conversion module from the external device interface.

Example 24 includes the signal interface unit of any of Examples 17-23, wherein the signal interface unit is configured to adjust characteristics reported to the channelized radio carrier base station interface based on the requirements of the channelized radio carrier base station interface.

Example 25 includes the signal interface unit of any of Examples 17-24, wherein the at least one uplink attribute of the uplink digitized radio frequency signal includes at least one of a power level, a gain, a delay, and an uplink noise floor.

Example 26 includes the signal interface unit of any of Examples 17-25, wherein adjusting the at least one uplink attribute of the second uplink signal received from the antenna side interface to comply with requirements of the external device includes scaling the uplink noise floor of the second uplink signal to make the uplink noise floor comply with requirements for uplink noise floor of the external device.

Example 27 includes the signal interface unit of any of Examples 17-26, wherein the first uplink signal includes I/Q pairs.

Example 28 includes the signal interface unit of any of Examples 17-27, wherein the antenna side interface is communicatively coupled to an antenna unit and receives the second uplink signals from the antenna unit; and wherein the antenna unit converts received radio frequency signals from a subscriber unit to the second uplink signals.

Example 29 includes the signal interface unit of any of Examples 17-28, wherein the antenna side interface receives the second uplink signals from the antenna unit across a wired medium.

Example 30 includes the signal interface unit of any of Examples 17-29, wherein the antenna side interface receives the second uplink signals from an intermediary device positioned between the antenna side interface and the antenna unit.

Example 31 includes the signal interface unit of Example 30, wherein the antenna side interface receives the second uplink signals from the intermediary device across a wired medium.

Example 32 includes the signal interface unit of any of Examples 30-31, wherein the intermediary device receives analog signals from the antenna unit, converts the analog signals to the second uplink signals, and communicates the second uplink signals to the antenna side interface.

Example 33 includes the signal interface unit of any of Examples 30-32, wherein the intermediary device receives the analog signals from the antenna unit across a wired medium.

Example 34 includes the signal interface unit of any of Examples 17-33, wherein the external device interface is further configured to receive a first downlink signal from an external device; wherein the antenna side interface is configured to communicate a second downlink signal from the antenna side interface to the distributed antenna system; and wherein the signal conversion module is further configured to convert between the first downlink signal and the second downlink signal at least in part by digitally adjusting at least one downlink attribute of the second downlink signal to comply with requirements of the external device.

Example 35 includes a method for making a distributed antenna system appear as a radio head in a digital radio system, comprising: receiving an uplink digitized radio frequency signal for a radio frequency carrier from the distributed antenna system at a signal interface unit; converting the uplink digitized radio frequency signal to an uplink channelized radio carrier at the signal interface unit at least in part by adjusting at least one uplink attribute of the uplink digitized radio frequency signal received from the distributed antenna system to comply with requirements of a channelized radio carrier base station interface communicatively coupled to the signal interface unit; communicating the uplink channelized radio carrier for the radio frequency carrier from the signal interface unit to the channelized radio carrier base station interface.

Example 36 includes the method of Example 35, wherein adjusting the at least one uplink attribute of the uplink digitized radio frequency signal received from the distributed antenna system to comply with requirements of the external device includes digitally adjusting the at least one uplink attribute.

Example 37 includes the method of any of Examples 35-36, wherein adjusting the at least one uplink attribute of the uplink digitized radio frequency signal received from the distributed antenna system to comply with requirements of the external device includes digitally scaling an uplink gain of the uplink digitized radio frequency signal.

Example 38 includes the method of any of Examples 35-37, wherein converting the uplink digitized radio frequency signal to an uplink channelized radio carrier further includes converting between two distinct framing structures.

Example 39 includes the method of any of Examples 35-38, wherein converting the uplink digitized radio frequency signal to an uplink channelized radio carrier further includes converting from a digitized representation of radio frequency spectrum into a baseband channelized representation of the radio frequency spectrum.

Example 40 includes the method of any of Examples 35-39, wherein the requirements of the channelized radio carrier base station interface are received at the signal conversion module from the channelized radio carrier base station interface.

Example 41 includes the method of any of Examples 35-40, further comprising adjusting characteristics reported to the channelized radio carrier base station interface based on the requirements of the channelized radio carrier base station interface.

Example 42 includes the method of any of Examples 35-41, wherein the at least one uplink attribute of the uplink digitized radio frequency signal includes at least one of a power level, a gain, a delay, and an uplink noise floor.

Example 43 includes the method of any of Examples 35-42, wherein adjusting the at least one uplink attribute of the uplink digitized radio frequency signal received from the distributed antenna system to comply with requirements of the channelized radio carrier base station interface includes scaling the uplink noise floor of the uplink digitized radio frequency signal to make the uplink noise floor comply with requirements for uplink noise floor of the channelized radio carrier base station interface.

Example 44 includes the method of any of Examples 35-43, wherein the uplink channelized radio carrier includes I/Q pairs.

Example 45 includes the method of any of Examples 35-44, wherein the distributed antenna system is a digital distributed antenna system that communicates digitized radio frequency signals between the signal interface unit and an antenna unit where the digitized radio frequency signals are converted to radio frequency signals and transmitted to a subscriber unit.

Example 46 includes the method of any of Examples 35-45, wherein the distributed antenna system communicates the digitized radio frequency signals between the signal interface unit and the antenna unit across a wired medium.

Example 47 includes the method of any of Examples 35-46, wherein the distributed antenna system is a hybrid distributed antenna system that communicates digitized radio frequency signals between the signal interface unit and an intermediary device, converts between digitized radio frequency signals and analog signals at the intermediary device, and communicates the analog signals from the intermediary device to an antenna unit where the analog signals are converted to radio frequency signals and transmitted to a subscriber unit.

Example 48 includes the method of any of Examples 35-47, wherein the distributed antenna system communicates the digitized radio frequency signals between the signal interface unit and the intermediary device across a wired medium.

Example 49 includes the method of any of Examples 35-48, wherein the distributed antenna system communicates the digitized radio frequency signals between the intermediary device and the antenna unit across a wired medium.

Example 50 includes the method of any of Examples 35-49, wherein the channelized radio carrier base station interface is part of a base band unit of a base station.

Example 51 includes the method of any of Examples 35-50, wherein the channelized radio carrier base station interface is at least one of a Common Public Radio Interface (CPRI) base station interface, an Open Base Station Architecture Initiative (OBSAI) base station interface, and an Open Radio Interface (ORI) interface; and wherein the downlink channelized radio carrier signal is formatted according to at least one of a Common Public Radio Interface (CPRI) standard, an Open Base Station Architecture Initiative (OBSAI) standard, and an Open Radio Interface (ORI) standard.

Example 52 includes the method of any of Examples 35-51, wherein the downlink digital radio frequency signal contains a digital representation of the radio carrier positioned within a set of spectrum that reflects its eventual location within radio frequency spectrum.

Example 53 includes the method of any of Examples 35-52, further comprising receiving a downlink channelized radio carrier for a second radio frequency carrier from the channelized radio carrier base station interface at the channelized radio carrier interface; communicating a downlink digitized radio frequency signal from the antenna side interface to the distributed antenna system; and converting between the downlink channelized radio carrier and the downlink radio frequency signal at the signal conversion module at least in part by adjusting at least one downlink attribute of the downlink digitized radio frequency signal to comply with requirements of the channelized radio carrier base station interface.

Example 54 includes a method of conforming uplink signals to requirements of an external device, comprising: receiving a first uplink signal from an antenna unit at an antenna side interface of a signal interface unit; converting the first uplink signal to a second uplink signal at the signal interface unit at least in part by adjusting at least one uplink attribute of the first uplink signal received from the antenna unit to comply with requirements of an external device communicatively coupled to the signal interface unit; and communicating the second uplink signal from an external device interface of the signal interface unit to the external device.

Example 55 includes the method of Example 54, wherein adjusting the at least one uplink attribute of the first uplink signal received from the antenna side interface to comply with requirements of the external device includes digitally adjusting the at least one uplink attribute.

Example 56 includes the method of any of Examples 54-55, wherein adjusting the at least one uplink attribute of the first uplink signal received from the antenna side interface to comply with requirements of the external device includes digitally scaling an uplink gain of the second uplink signal.

Example 57 includes the method of any of Examples 54-56, wherein converting the first uplink signal to a second uplink signal at the signal interface unit further includes converting between two distinct framing structures.

Example 58 includes the method of any of Examples 54-57, wherein converting the first uplink signal to a second uplink signal at the signal interface unit further includes converting from a digitized representation of radio frequency spectrum into a baseband channelized representation of the radio frequency spectrum.

Example 59 includes the method of any of Examples 54-58, wherein the external device interface is a baseband signal interface unit.

Example 60 includes the method of any of Examples 54-59, wherein the external device interface is at least one of a Common Public Radio Interface (CPRI) external device interface, an Open Base Station Architecture Initiative (OBSAI) external device interface, and an Open Radio Interface (ORI) external device interface.

Example 61 includes the method of any of Examples 54-60, further comprising receiving the requirements of the external device at the signal conversion module from the external device interface.

Example 62 includes the method of any of Examples 54-61, further comprising adjusting characteristics reported to the external device based on the requirements of the external device.

Example 63 includes the method of any of Examples 54-62, wherein the at least one uplink attribute of the first uplink signal includes at least one of a power level, a gain, a delay, and an uplink noise floor.

Example 64 includes the method of any of Examples 54-63, wherein adjusting the at least one uplink attribute of the second uplink signal received from the antenna side interface to comply with requirements of the external device includes scaling the uplink noise floor of the second uplink signal to make the uplink noise floor comply with requirements for uplink noise floor of the external device.

Example 65 includes the method of any of Examples 54-64, wherein the second uplink signal includes I/Q pairs.

Example 66 includes the method of any of Examples 54-65, further comprising converting uplink radio frequency signals into the first uplink signals at the antenna unit.

Example 67 includes the method of any of Examples 54-66, wherein receiving the first uplink signals from the antenna unit at an antenna side interface occurs across a wired medium.

Example 68 includes the method of any of Examples 54-67, wherein receiving the first uplink signals from the antenna unit at the antenna side interface includes receiving the first uplink signals from an intermediary device positioned between the antenna side interface and the antenna unit.

Example 69 includes the method of Example 68, wherein receiving the first uplink signals from the intermediary device positioned between the antenna side interface and the antenna unit occurs across a wired medium.

Example 70 includes the method of any of Examples 68-69, further comprising reviving analog signals from the antenna unit at the intermediary device, converting the analog signals to the first uplink signals at the intermediary device, and communicating the first uplink signal from the intermediary device to the antenna side interface.

Example 71 includes the method of any of Examples 68-70, further comprising receiving the analog signals from the antenna unit at the intermediary device across a wired medium.

Example 72 includes the method of any of Examples 54-71, further comprising receiving a first downlink signal from an external device; communicating a second downlink signal from the antenna side interface to the distributed antenna system; and converting between the first downlink signal and the second downlink signal at the signal conversion module at least in part by digitally adjusting at least one downlink attribute of the second downlink signal to comply with requirements of the external device.

What is claimed is:

1. A signal interface unit for a distributed antenna system, comprising:
    a channelized radio carrier interface configured to communicate an uplink channelized radio carrier for a radio frequency carrier to a channelized radio carrier base station interface;
    an antenna side interface configured to receive an uplink digitized radio frequency signal from the distributed antenna system communicatively coupled to the antenna side interface; and
    a signal conversion module communicatively coupled between the channelized radio carrier interface and the antenna side interface and configured to convert between the uplink digitized radio frequency signal and the uplink channelized radio carrier at least in part by adjusting at least one uplink attribute of the uplink digitized radio frequency signal received from the distributed antenna system to comply with requirements of the channelized radio carrier base station interface to cause the distributed antenna system to appear as a remote radio head to the channelized radio carrier interface.

2. The signal interface unit of claim 1, wherein adjusting the at least one uplink attribute of the uplink digitized radio frequency signal received from the distributed antenna system to comply with requirements of the channelized radio carrier base station interface includes digitally adjusting the at least one uplink attribute.

3. The signal interface unit of claim 1, wherein adjusting the at least one uplink attribute of the uplink digitized radio frequency signal received from the distributed antenna system to comply with requirements of the channelized radio carrier base station interface includes digitally scaling an uplink gain of the uplink digitized radio frequency signal.

4. The signal interface unit of claim 1, wherein the signal conversion module is further configured to convert between the uplink digitized radio frequency signal and the uplink channelized radio carrier by converting between two distinct framing structures.

5. The signal interface unit of claim 1, wherein the signal conversion module is further configured to convert between the uplink digitized radio frequency signal and the uplink channelized radio carrier by converting from a digitized representation of radio frequency spectrum into a baseband channelized representation of the radio frequency spectrum.

6. The signal interface unit of claim 1, wherein the requirements of the channelized radio carrier base station interface are received at the signal conversion module from the channelized radio carrier base station interface.

7. The signal interface unit of claim 1, wherein the signal interface unit is configured to adjust characteristics reported to the channelized radio carrier base station interface based on the requirements of the channelized radio carrier base station interface to cause the distributed antenna system to appear as a remote ratio head to the channelized radio carrier interface.

8. The signal interface unit of claim 1, wherein the at least one uplink attribute of the uplink digitized radio frequency signal includes at least one of a power level, a gain, a delay, and an uplink noise floor.

9. The signal interface unit of claim 1, wherein adjusting the at least one uplink attribute of the uplink digitized radio frequency signal received from the distributed antenna system to comply with requirements of the channelized radio carrier base station interface includes scaling an uplink noise floor of the uplink digitized radio frequency signal to make the uplink noise floor comply with requirements for uplink noise floor of the channelized radio carrier base station interface.

10. The signal interface unit of claim 1, wherein the uplink channelized radio carrier includes I/Q pairs.

11. The signal interface unit of claim 1, wherein the distributed antenna system is a digital distributed antenna system that communicates digitized radio frequency signals between the signal interface unit and an antenna unit where the digitized radio frequency signals are converted to radio frequency signals and transmitted to a subscriber unit.

12. The signal interface unit of claim 1, wherein the distributed antenna system communicates the digitized radio frequency signals between the signal interface unit and the antenna unit across a wired medium.

13. The signal interface unit of claim 1, wherein the distributed antenna system is a hybrid distributed antenna system that communicates digitized radio frequency signals between the signal interface unit and an intermediary device, converts between digitized radio frequency signals and analog signals at the intermediary device, and communicates the analog signals from the intermediary device to an antenna unit where the analog signals are converted to radio frequency signals and transmitted to a subscriber unit.

14. The signal interface unit of claim 13, wherein the distributed antenna system communicates the digitized radio frequency signals between the signal interface unit and the intermediary device across a wired medium.

15. The signal interface unit of claim 13, wherein the distributed antenna system communicates the digitized radio frequency signals between the intermediary device and the antenna unit across a wired medium.

16. The signal interface unit of claim 1, wherein the channelized radio carrier interface is further configured to receive a downlink channelized radio carrier for a second radio frequency carrier from a channelized radio carrier base station interface;
    wherein the antenna side interface is configured to communicate a downlink digitized radio frequency signal from the antenna side interface to the distributed antenna system; and
    wherein the signal conversion module is further configured to convert between the downlink channelized radio carrier and the downlink digitized radio frequency signal at least in part by adjusting at least one downlink attribute of the downlink digitized radio frequency signal to comply with requirements of the channelized radio carrier base station interface.

17. A signal interface unit for an antenna system, comprising:
    an external device interface configured to communicate a first uplink signal to an external device;
    an antenna side interface configured to receive a second uplink signal from an antenna unit communicatively coupled to the antenna side interface;
    a signal conversion module communicatively coupled between the external device interface and the antenna side interface and configured to convert from the second uplink signal to the first uplink signal at least in part by digitally adjusting at least one uplink attribute of the second uplink signal received from the antenna side interface to comply with requirements of the external device to cause the antenna system to appear as a remote radio head to the external device.

18. The signal interface unit of claim 17, wherein adjusting the at least one uplink attribute of the second uplink signal received from the antenna side interface to comply with requirements of the external device includes digitally scaling an uplink gain of the second uplink signal.

19. The signal interface unit of claim 17, wherein the signal conversion module is further configured to convert between the second uplink signal and the first uplink signal by converting between two distinct framing structures.

20. The signal interface unit of claim 17, wherein the signal conversion module is further configured to convert between the second uplink signal and the first uplink signal by converting from a digitized representation of radio frequency spectrum into a baseband channelized representation of the radio frequency spectrum.

21. The signal interface unit of claim 17, wherein the external device interface is a baseband signal interface unit.

22. The signal interface unit of claim 17, wherein the external device interface is at least one of a Common Public Radio Interface (CPRI) external device interface, an Open Base Station Architecture Initiative (OBSAI) external device interface, and an Open Radio Interface (ORI) external device interface.

23. The signal interface unit of claim 17, wherein the requirements of the external device are received at the signal conversion module from the external device interface.

24. The signal interface unit of claim 17, wherein the signal interface unit is configured to adjust characteristics reported to the channelized radio carrier base station interface based on the requirements of the channelized radio carrier base station interface to cause the antenna system to appear as a remote radio head to the external device.

25. The signal interface unit of claim 17, wherein the at least one uplink attribute of the uplink digitized radio frequency signal includes at least one of a power level, a gain, a delay, and an uplink noise floor.

26. The signal interface unit of claim 17, wherein adjusting the at least one uplink attribute of the second uplink signal received from the antenna side interface to comply with requirements of the external device includes scaling the uplink noise floor of the second uplink signal to make the uplink noise floor comply with requirements for uplink noise floor of the external device.

27. The signal interface unit of claim 17, wherein the first uplink signal includes I/Q pairs.

28. The signal interface unit of claim 17, wherein the antenna side interface is communicatively coupled to an antenna unit and receives the second uplink signals from the antenna unit; and
wherein the antenna unit converts received radio frequency signals from a subscriber unit to the second uplink signals.

29. The signal interface unit of claim 17, wherein the antenna side interface receives the second uplink signals from the antenna unit across a wired medium.

30. The signal interface unit of claim 17, wherein the antenna side interface receives the second uplink signals from an intermediary device positioned between the antenna side interface and the antenna unit.

31. The signal interface unit of claim 30, wherein the antenna side interface receives the second uplink signals from the intermediary device across a wired medium.

32. The signal interface unit of claim 30, wherein the intermediary device receives analog signals from the antenna unit, converts the analog signals to the second uplink signals, and communicates the second uplink signals to the antenna side interface.

33. The signal interface unit of claim 30, wherein the intermediary device receives the analog signals from the antenna unit across a wired medium.

34. The signal interface unit of claim 17, wherein the external device interface is further configured to receive a first downlink signal from an external device;
wherein the antenna side interface is configured to communicate a second downlink signal from the antenna side interface to the distributed antenna system; and
wherein the signal conversion module is further configured to convert between the first downlink signal and the second downlink signal at least in part by digitally adjusting at least one downlink attribute of the second downlink signal to comply with requirements of the external device.

35. A method for making a distributed antenna system appear as a radio head in a digital radio system, comprising:
receiving an uplink digitized radio frequency signal for a radio frequency carrier from the distributed antenna system at a signal interface unit;
converting the uplink digitized radio frequency signal to an uplink channelized radio carrier at the signal interface unit at least in part by adjusting at least one uplink attribute of the uplink digitized radio frequency signal received from the distributed antenna system to comply with requirements of a channelized radio carrier base station interface communicatively coupled to the signal interface unit to cause the distributed antenna system to appear as a remote radio head to the channelized radio carrier base station interface;
communicating the uplink channelized radio carrier for the radio frequency carrier from the signal interface unit to the channelized radio carrier base station interface.

36. The method of claim 35, wherein adjusting the at least one uplink attribute of the uplink digitized radio frequency signal received from the distributed antenna system to comply with requirements of the channelized radio carrier base station interface includes digitally adjusting the at least one uplink attribute.

37. The method of claim 35, wherein adjusting the at least one uplink attribute of the uplink digitized radio frequency signal received from the distributed antenna system to comply with requirements of the channelized radio carrier base station interface includes digitally scaling an uplink gain of the uplink digitized radio frequency signal.

38. The method of claim 35, wherein converting the uplink digitized radio frequency signal to an uplink channelized radio carrier further includes converting between two distinct framing structures.

39. The method of claim 35, wherein converting the uplink digitized radio frequency signal to an uplink channelized radio carrier further includes converting from a digitized representation of radio frequency spectrum into a baseband channelized representation of the radio frequency spectrum.

40. The method of claim 35, wherein the requirements of the channelized radio carrier base station interface are received at the signal conversion module from the channelized radio carrier base station interface.

41. The method of claim 35, further comprising adjusting characteristics reported to the channelized radio carrier base station interface based on the requirements of the channelized radio carrier base station interface to cause the distributed antenna system to appear as a remote radio head to the channelized radio carrier base station interface.

42. The method of claim 35, wherein the at least one uplink attribute of the uplink digitized radio frequency signal includes at least one of a power level, a gain, a delay, and an uplink noise floor.

43. The method of claim 35, wherein adjusting the at least one uplink attribute of the uplink digitized radio frequency signal received from the distributed antenna system to comply with requirements of the channelized radio carrier base station interface includes scaling the uplink noise floor of the uplink digitized radio frequency signal to make the uplink noise floor comply with requirements for a second uplink noise floor of the channelized radio carrier base station interface.

44. The method of claim 35, wherein the uplink channelized radio carrier includes I/Q pairs.

45. The method of claim 35, wherein the distributed antenna system is a digital distributed antenna system that communicates digitized radio frequency signals between the signal interface unit and an antenna unit where the digitized radio frequency signals are converted to radio frequency signals and transmitted to a subscriber unit.

46. The method of claim 35, wherein the distributed antenna system communicates the digitized radio frequency signals between the signal interface unit and the antenna unit across a wired medium.

47. The method of claim 35, wherein the distributed antenna system is a hybrid distributed antenna system that communicates digitized radio frequency signals between the signal interface unit and an intermediary device, converts between digitized radio frequency signals and analog signals at the intermediary device, and communicates the analog signals from the intermediary device to an antenna unit where the analog signals are converted to radio frequency signals and transmitted to a subscriber unit.

48. The method of claim 47, wherein the distributed antenna system communicates the digitized radio frequency signals between the signal interface unit and the intermediary device across a wired medium.

49. The method of claim 47, wherein the distributed antenna system communicates the digitized radio frequency signals between the intermediary device and the antenna unit across a wired medium.

50. The method of claim 35, wherein the channelized radio carrier base station interface is part of a base band unit of a base station.

51. The method of claim 35, wherein the channelized radio carrier base station interface is at least one of a Common Public Radio Interface (CPRI) base station interface, an Open Base Station Architecture Initiative (OBSAI) base station interface, and an Open Radio Interface (ORI) interface; and wherein the downlink channelized radio carrier signal is formatted according to at least one of a Common Public Radio Interface (CPRI) standard, an Open Base Station Architecture Initiative (OBSAI) standard, and an Open Radio Interface (ORI) standard.

52. The method of claim 35, wherein the downlink digital radio frequency signal contains a digital representation of the radio carrier positioned within a set of spectrum that reflects its eventual location within radio frequency spectrum.

53. The method of claim 35, further comprising receiving a downlink channelized radio carrier for a second radio frequency carrier from the channelized radio carrier base station interface at the channelized radio carrier interface;

communicating a downlink digitized radio frequency signal from the antenna side interface to the distributed antenna system; and converting between the downlink channelized radio carrier and the downlink radio frequency signal at the signal conversion module at least in part by adjusting at least one downlink attribute of the downlink digitized radio frequency signal to comply with requirements of the channelized radio carrier base station interface.

54. A method of conforming uplink signals to requirements of an external device, comprising:

receiving a first uplink signal from an antenna unit at an antenna side interface of a signal interface unit;

converting the first uplink signal to a second uplink signal at the signal interface unit at least in part by adjusting at least one uplink attribute of the first uplink signal received from the antenna unit to comply with requirements of an external device communicatively coupled to the signal interface unit to cause the signal interface unit and the antenna unit to appear as a remote radio head to the external device; and communicating the second uplink signal from an external device interface of the signal interface unit to the external device.

55. The method of claim 54, wherein adjusting the at least one uplink attribute of the first uplink signal received from the antenna side interface to comply with requirements of the external device includes digitally adjusting the at least one uplink attribute.

56. The method of claim 54, wherein adjusting the at least one uplink attribute of the first uplink signal received from the antenna side interface to comply with requirements of the external device includes digitally scaling an uplink gain of the second uplink signal.

57. The method of claim 54, wherein converting the first uplink signal to a second uplink signal at the signal interface unit further includes converting between two distinct framing structures.

58. The method of claim 54, wherein converting the first uplink signal to a second uplink signal at the signal interface unit further includes converting from a digitized representation of radio frequency spectrum into a baseband channelized representation of the radio frequency spectrum.

59. The method of claim 54, wherein the external device interface is a baseband signal interface unit.

60. The method of claim 54, wherein the external device interface is at least one of a Common Public Radio Interface (CPRI) external device interface, an Open Base Station Architecture Initiative (OBSAI) external device interface, and an Open Radio Interface (ORI) external device interface.

61. The method of claim 54, further comprising receiving the requirements of the external device at the signal conversion module from the external device interface.

62. The method of claim 54, further comprising adjusting characteristics reported to the external device based on the requirements of the external device to cause the signal interface unit and the antenna unit to appear as a remote radio head to the external device.

63. The method of claim 54, wherein the at least one uplink attribute of the first uplink signal includes at least one of a power level, a gain, a delay, and an uplink noise floor.

64. The method of claim 54, wherein adjusting the at least one uplink attribute of the second uplink signal received from the antenna side interface to comply with requirements of the external device includes scaling the uplink noise floor of the second uplink signal to make the uplink noise floor comply with requirements for a second uplink noise floor of the external device.

65. The method of claim 54, wherein the second uplink signal includes I/Q pairs.

66. The method of claim 54, further comprising converting uplink radio frequency signals into the first uplink signals at the antenna unit.

67. The method of claim 54, wherein receiving the first uplink signals from the antenna unit at an antenna side interface occurs across a wired medium.

68. The method of claim 54, wherein receiving the first uplink signals from the antenna unit at the antenna side interface includes receiving the first uplink signals from an intermediary device positioned between the antenna side interface and the antenna unit.

69. The method of claim 68, wherein receiving the first uplink signals from the intermediary device positioned between the antenna side interface and the antenna unit occurs across a wired medium.

70. The method of claim 68, further comprising reviving analog signals from the antenna unit at the intermediary device, converting the analog signals to the first uplink signals at the intermediary device, and communicating the first uplink signal from the intermediary device to the antenna side interface.

71. The method of claim 68, further comprising receiving the analog signals from the antenna unit at the intermediary device across a wired medium.

72. The method of claim 54, further comprising receiving a first downlink signal from an external device;
communicating a second downlink signal from the antenna side interface to the distributed antenna system; and
converting between the first downlink signal and the second downlink signal at the signal conversion module at least in part by digitally adjusting at least one downlink attribute of the second downlink signal to comply with requirements of the external device.

\* \* \* \* \*